(12) United States Patent
Amini et al.

(10) Patent No.: US 11,033,981 B2
(45) Date of Patent: Jun. 15, 2021

(54) ACOUSTO-OPTIC MODULATOR CONFIGURATIONS FOR QUANTUM PROCESSING

(71) Applicants: University of Maryland, College Park, College Park, MD (US); IonQ, Inc., College Park, MD (US)

(72) Inventors: Jason Madjdi Amini, Takoma Park, MD (US); Jonathan Mizrahi, Silver Spring, MD (US); Kai Hudek, Hyattsville, MD (US); Michael Goldman, College Park, MD (US)

(73) Assignees: University of Maryland, College Park, College Park, MD (US); IonQ, Inc., College Park, MD (US)

( * ) Notice: Subject to any disclaimer, the term of this patent is extended or adjusted under 35 U.S.C. 154(b) by 100 days.

(21) Appl. No.: 16/515,508

(22) Filed: Jul. 18, 2019

(65) Prior Publication Data

US 2020/0023462 A1 Jan. 23, 2020

Related U.S. Application Data

(60) Provisional application No. 62/702,111, filed on Jul. 23, 2018.

(51) Int. Cl.
*B23K 26/064* (2014.01)
*G06N 10/00* (2019.01)
(Continued)

(52) U.S. Cl.
CPC .............. *B23K 26/064* (2015.10); *G02F 1/33* (2013.01); *G06N 10/00* (2019.01); *B82Y 10/00* (2013.01)

(58) Field of Classification Search
CPC .................................. G06N 10/00; G02F 1/33
See application file for complete search history.

(56) References Cited

U.S. PATENT DOCUMENTS 6,800,837 B1 10/2004 Ichimura et al.
2017/0050266 A1* 2/2017 Mueller ............... B23K 26/064
(Continued)

FOREIGN PATENT DOCUMENTS

CN 104036841 A 9/2014

OTHER PUBLICATIONS

International Search Report and Written Opinion corresponding to International Application No. PCT/US2019/02841, dated Mar. 3, 2020.
(Continued)

*Primary Examiner* — Sung H Pak
(74) *Attorney, Agent, or Firm* — Arent Fox LLP

(57) ABSTRACT

The disclosure describes various aspects of acousto-optic modulator (AOM) configurations for quantum processing. A method is described including generating, by a first AOM from a laser beam, first and second diffracted laser beams at different angles based on first and second radio frequency (RF) tones. An optical component focuses the diffracted laser beams onto a second AOM, which generates third and fourth diffracted laser beams based on the first RF tone and a third RF tone and the second RF tone and a fourth RF tone respectively, wherein the third and fourth diffracted laser beams are substantially parallel when incident on a respective ion in a chain of ions in a trap. Quantum information in the ion is controlled to perform quantum processing based on the third and fourth diffracted laser beams. Another method is described including generating, by an AOM, a small polarization rotation of an undiffracted laser beam.

23 Claims, 16 Drawing Sheets

(51) Int. Cl.
*G02F 1/33*        (2006.01)
*B82Y 10/00*       (2011.01)

(56) References Cited

U.S. PATENT DOCUMENTS

2018/0299745 A1* 10/2018 Morse ................... H01S 3/10
2020/0089028 A1*  3/2020 Lange ................... G02F 1/11
2020/0372392 A1* 11/2020 Nam ..................... B82Y 10/00

OTHER PUBLICATIONS

Keitch, BC, et al., "Injection locking of violet laser diodes with a 3.2 GHz offset frequency for driving Raman transitions in 43Ca+", Optics Letters, Optical Society of America, US, vol. 38, No. 6, Mar. 15, 2013, pp. 830-832.
Wright, John, et al., "Scalable Quantum Computing Architecture with Mixed Species Ion Chains", URL: <https:/arxiv.org/pdf/1410.0037.pdf>, Oct. 2, 2014, pp. 1-7.
International Invitation to Pay Additional Fees corresponding to International Application No. PCT/US2019/042841, dated Jan. 13, 2020.
Sangtaek, Kim, et al., "Doppler-free, multiwavelength acousto-optic deflector for two-photon addressing arrays of Rb atoms in a quantum information processor", Applied Optics, vol. 47, No. 11, Apr. 10, 2008, pp. 1816-1831.
Akerman, Nitzan, et al., "Universal gate-set for trapped-ion qubits using a narrow linewidth diode laser", Cornell Unviersity, Quantum Physics, May 11, 2015, pp. 1-21.

\* cited by examiner

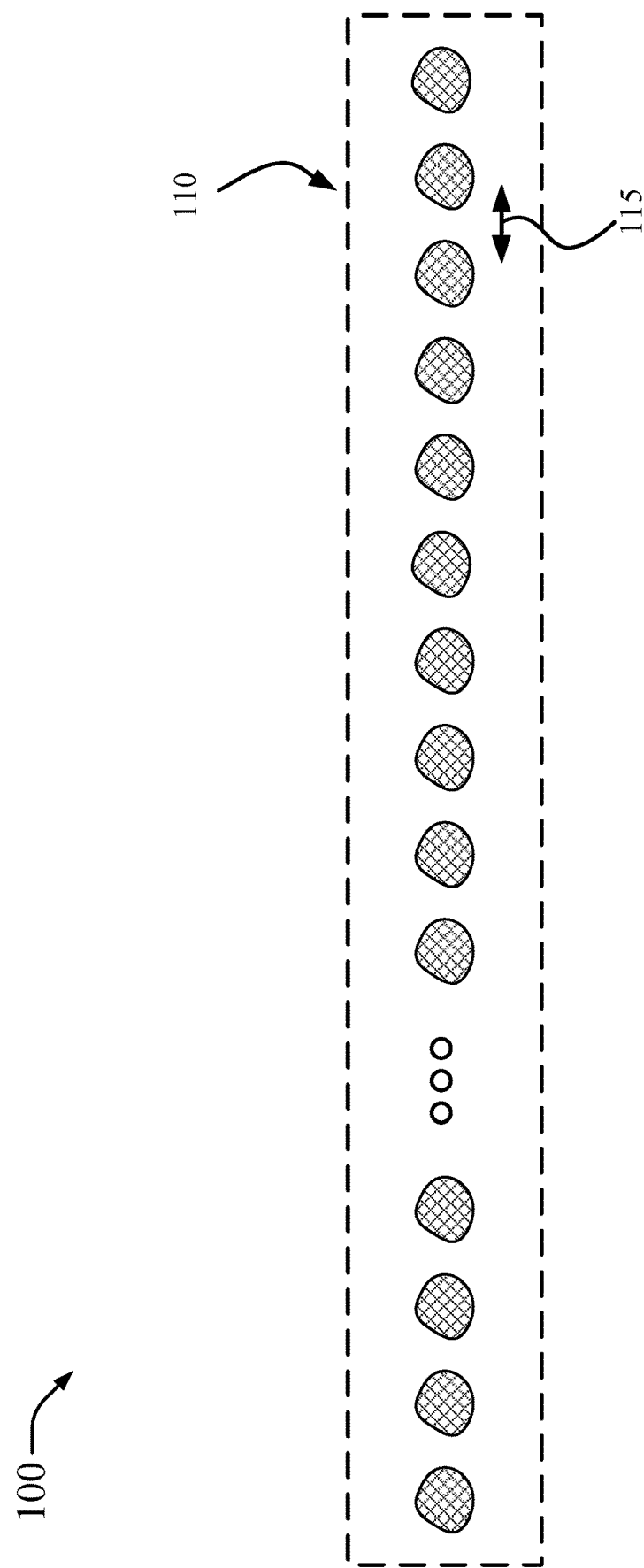

ACOUSTO-OPTIC MODULATOR CONFIGURATIONS FOR QUANTUM PROCESSING

CROSS REFERENCE TO RELATED APPLICATION

The present application claims priority to and the benefit from U.S. Provisional Patent Application No. 62/702,111, entitled "ACOUSTO-OPTIC MODULATOR CONFIGURATIONS FOR QUANTUM PROCESSING," and filed on Jul. 23, 2018, the contents of which are incorporated herein by reference in their entirety.

GOVERNMENT LICENSE RIGHTS

This invention was made with government support under Award No. W911NF1610082 by IARPA. The government has certain rights in the invention.

BACKGROUND OF THE DISCLOSURE

Aspects of the present disclosure generally relate to quantum systems, and more specifically, to acousto-optic modulator (AOM) configurations for quantum processing in quantum systems.

Trapped atoms are one of the leading implementations for quantum information processing. Atomic-based qubits can be used as quantum memories, as quantum gates in quantum computers and simulators, and can act as nodes for quantum communication networks.

Atom and ion based quantum computing, however, need precise control of laser phases, frequencies, amplitudes, and/or polarities to manipulate the quantum information stored in the qubits. AOMs are often used to provide phase, frequency and amplitude control. One of the AOMs features is that the controlled laser beam is deflected from the uncontrolled portion, allowing the two to be separated. A disadvantage is that this deflection is frequency dependent. For example, if two or more frequencies are applied to an AOM, the resulting beams will diverge from each other. Refocusing this fan of beams onto an atom or ion requires complex optics and the resulting beams do not co-propagate (e.g., are not aligned or substantially parallel at the point where they reach the atom). The later limits isolation from undesired degrees of freedom during quantum operations. Removing or reducing this frequency dependence would allow for improved control of quantum operations.

In addition, fine, rapid control of the light polarization can allow for reduced systematics in the quantum operations. The main method for such control are electro-optic modulators (EOMs), which suffer from polarization drift. An alternative to EOMs that would reduce or eliminate this drift would provide a powerful tool for quality quantum operations.

Accordingly, techniques that allow for better refocusing of beams onto an atom or ion and alternatives to EOMs that reduce or eliminate drift are desirable.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

The disclosure describes configurations of pairs of AOMs that reduce, or eliminate, the frequency dependence of the AOMs while maintaining the phase, frequency, and amplitude control. Also described are configurations that take advantage of the polarization dependence of AOMs to control the polarization of the transmitted light.

In an aspect of the disclosure, a method is described for controlling laser beam propagation in quantum processing. The method includes generating, by a first AOM from an incident laser beam, a first diffracted laser beam based on a first radio frequency (RF) tone and a second diffracted laser beam based on a second RF tone, wherein the first diffracted laser beam and the second diffracted laser beam are diffracted at different angles; focusing, via an optical component, the first diffracted laser beam and the second diffracted laser beam onto a second AOM; generating, by the second AOM from the first diffracted laser beam and the second diffracted laser beam, at least a third diffracted laser beam based on the first RF tone and a third RF tone and a fourth diffracted laser beam based on the second RF tone and a fourth RF tone, wherein the third diffracted laser beam and the fourth diffracted laser beam are diffracted to be substantially parallel when incident on a respective ion in a chain of ions in a trap; and controlling quantum information in the ion to perform quantum processing based on the third diffracted laser beam and the fourth diffracted laser beam.

In another aspect of the disclosure, a method is described for controlling laser beam propagation in quantum processing. The method includes generating, by a first AOM from an incident laser beam, a first diffracted laser beam based on a first RF tone and a second diffracted laser beam based on a second RF tone, wherein the first diffracted laser beam and the second diffracted laser beam are diffracted at different angles; focusing, via an optical component, the first diffracted laser beam and the second diffracted laser beam onto opposite Bragg angle paths into a second AOM; generating, by the second AOM from the first diffracted laser beam and the second diffracted laser beam, at least a third diffracted laser beam based on the first RF tone and a third RF tone and a fourth diffracted laser beam based on the second RF tone and the third RF tone, wherein the third diffracted laser beam and the fourth diffracted laser beam are diffracted to be substantially parallel when incident on a respective ion in a chain of ions in a trap; and controlling quantum information in the ion to perform quantum processing based on the third diffracted laser beam and the fourth diffracted laser beam.

In another aspect of the disclosure, a quantum information processing (QIP) system is described for controlling laser beam propagation in quantum processing. The QIP system includes one or more optical sources configured to generate a laser beam; a first AOM configured to generate, from the laser beam, a first diffracted laser beam based on a first RF tone and a second diffracted laser beam based on a second RF tone, wherein the first diffracted laser beam and the second diffracted laser beam are diffracted at different angles; an optical component configured to focus the first diffracted laser beam and the second diffracted laser beam onto a second AOM; a second AOM configured to generate, from the first diffracted laser beam and the second diffracted laser beam, at least a third diffracted laser beam based on the first RF tone and a third RF tone and a fourth diffracted laser beam based on the second RF tone and a fourth RF tone, wherein the third diffracted laser beam and the fourth diffracted laser beam are diffracted to be substantially parallel when incident on a respective ion in a chain of ions in a trap; and a beam controller configured to control quantum information in the ion to perform quantum processing based on the third diffracted laser beam and the fourth diffracted laser beam.

In yet another aspect of the disclosure, a method is described for polarization control in quantum processing. The method includes providing a laser beam incident on an AOM; generating by the AOM from the laser beam and based on a control RF signal applied to the AOM, an un-diffracted laser beam and a diffracted laser beam, a polarization of the un-diffracted laser beam being rotated with respect to a polarization of the incident laser beam; and applying the un-diffracted laser beam to an ion in a chain of ions in a trap to perform quantum processing by controlling quantum information in the ion.

Each of the methods described herein may also be implemented in a QIP system or apparatus, and as part of a computer-readable medium.

BRIEF DESCRIPTION OF THE DRAWINGS

The appended drawings illustrate only some implementation and are therefore not to be considered limiting of scope.

FIG. 1A illustrates a diagram representing of a trap of atomic ions that form a linear crystal or lattice in accordance with aspects of the disclosure.

DETAILED DESCRIPTION

Figure 1B:
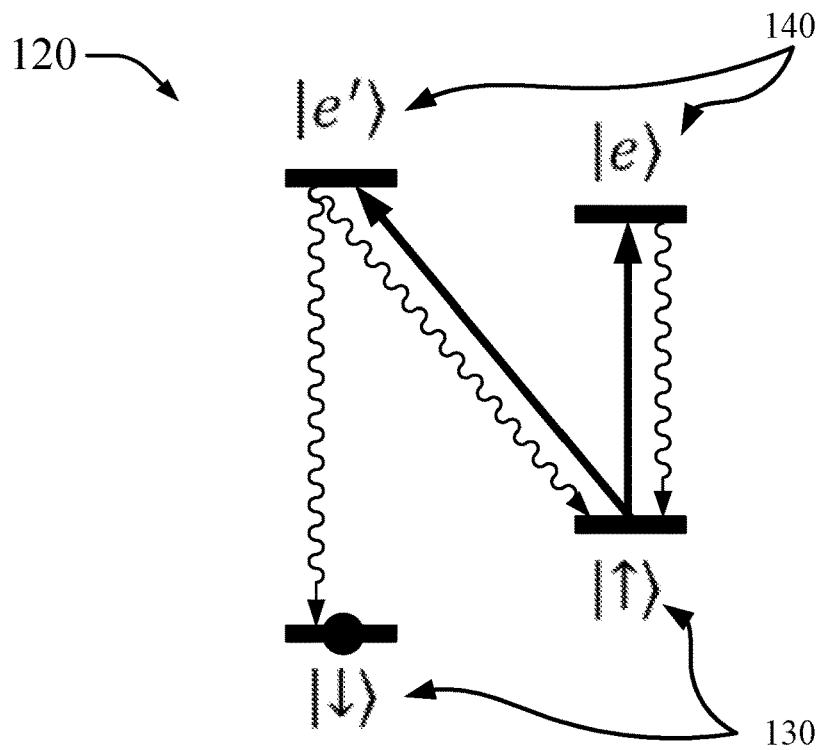
FIG. 1B is a diagram illustrating an example of a reduced energy level diagram showing the application of laser radiation for state initialization in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, trapped atoms may be used to implement quantum information processing. Atomic-based qubits can be used as different type of devices, including but not limited to quantum memories, quantum gates in quantum computers and simulators, and nodes for quantum communication networks. Qubits based on trapped atomic ions can have very good coherence properties, can be prepared and measured with nearly 100% efficiency, and can be readily entangled with each other by modulating their Coulomb interaction with suitable external control fields such as optical or microwave fields. As used in this disclosure, the terms "atomic ions," "atoms," "ionized atoms," and "ions" may be used interchangeably to describe the particles that are to be confined, or are actually confined, in a trap to form a crystal, a lattice, or similar arrangement or configuration. This disclosure describes techniques in the form of methods or processes and equipment or apparatuses for using AOMs in quantum processing in certain configurations that help reduce the frequency dependence of the AOMs while maintaining phase, frequency, and amplitude control. This disclosure also describes techniques in the form of methods or processes and equipment or apparatuses for using the polarization dependence of AOMs to control the polarization of transmitted light.

The typical ion trap geometry or structure used for quantum information and metrology purposes is the linear radio frequency (RF) Paul trap (also referred to as an RF trap or simply a Paul trap), where nearby electrodes hold static and dynamic electrical potentials that lead to an effective inhomogeneous harmonic confinement of the ions. The RF Paul trap is a type of trap that uses electric fields to trap or confine charged particles in a particular region, position, or location. When atomic ions are laser-cooled to very low temperatures in such a trap, the atomic ions form a stationary crystal of qubits (e.g., a structured arrangement of qubits), with Coulomb repulsion balancing the external confinement force. For sufficient trap anisotropy, the ions can form a linear crystal along the weak direction of confinement, and this is the arrangement typically employed for applications in quantum information and metrology.

Atom and ion quantum computing needs precise control of laser phases, frequencies, amplitudes, and polarities (e.g., polarization) to manipulate the quantum information stored in the qubits in a crystal or lattice. For example, the characteristics of laser beams used to enable or implement different quantum gates using qubits, generally referred to as gate beams, need to be precisely controlled to effectively perform the appropriate quantum operations. Below are additional details on various techniques to use AOM configurations for improved quantum processing using such qubits.

FIG. 1A illustrates a diagram 100 representing the trapping of atomic ions in a linear crystal 110 using, for example, a linear RF Paul trap (by using electrodes inside a vacuum chamber). In the example shown in FIG. 1A, a vacuum chamber in a quantum system can include a set of electrodes for trapping N (N≥1) atomic Ytterbium ions (e.g., $^{171}$Yb$^+$ ions) which are confined in the linear crystal 110 and can be laser-cooled to be nearly at rest. The number of atomic ions trapped can be configurable. The atoms are illuminated with laser radiation tuned to a resonance in $^{171}$Yb$^+$ and the fluorescence of the atomic ions is imaged onto a camera. In an example, atomic ions can be separated by a distance 115 of about 5 microns (μm) from each other (e.g., in a range of 3-7 μm), which can be verified by fluorescence. The separation of the atomic ions is determined by a balance between the external confinement force and Coulomb repulsion.

Figure 1C:
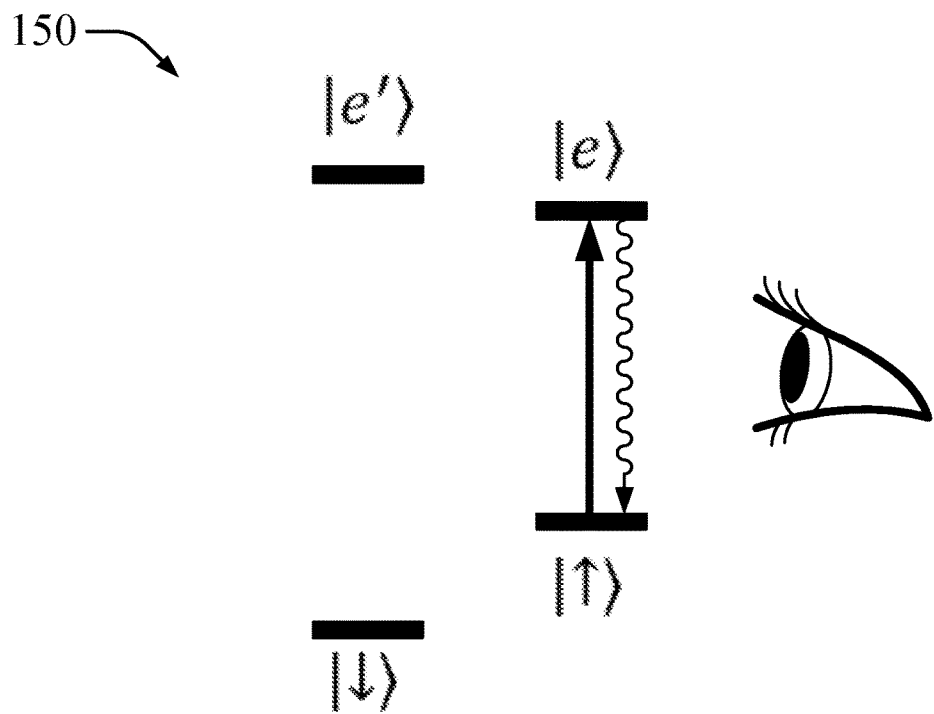
FIG. 1C is a diagram illustrating an example of a reduced energy level diagram showing the application of laser radiation for qubit state detection through fluorescence in accordance with aspects of the disclosure.

Strong fluorescence of individual trapped atomic ions relies on the efficient cycling of photons, thus the atomic structure of the ion must have a strong closed optical transition that allows for laser-cooling of the motion, qubit state initialization, and efficient qubit readout. This may rule out many atomic ion species, apart from simple atomic ions with a lone outer electron, such as the alkaline-earths (Be$^+$, Mg$^+$, Ca$^+$, Sr$^+$, Ba$^+$) and particular transition metals (Zn$^+$, Hg$^+$, Cd$^+$, and Yb$^+$). Within these atomic ions, quantum bits can be represented by two stable electronic levels, often characterized by an effective spin with the two states $|\uparrow\rangle$ and $|\downarrow\rangle$, or equivalently $|1\rangle$ and $|0\rangle$. FIG. 1B and FIG. 1C show the reduced energy level diagrams 120 and 150, respectively, for atomic ion $^{171}$Yb$^+$ where the qubit levels $|\uparrow\rangle$ and $|\downarrow\rangle$ 130 are represented by the stable hyperfine levels in the ground electronic state, and are separated by frequency $\omega_0/2\pi=12.642812$ GHz. The excited electronic states $|e\rangle$ and $|e'\rangle$ 140 in $^{171}$Yb$^+$ are themselves split by a smaller hyperfine coupling and are separated from the ground states by an optical interval having an energy corresponding to an optical wavelength of 369.53 nm.

Laser radiation tuned just below resonance in these optical transitions allows for Doppler laser cooling to confine the atomic ions near the bottom of the trap. Other more sophisticated forms of laser cooling can bring the atomic ions to be nearly at rest in the trap.

When a bichromatic laser beam (e.g., a beam with two tones produced by sidebands resulting from optical modulation) resonant with both $|\uparrow\rangle\leftrightarrow|e\rangle$ and $|\downarrow\rangle\leftrightarrow|e'\rangle$ transitions is applied to the atom, it rapidly falls into the state $|\downarrow\rangle$ and no longer interacts with the light field, allowing the initialization of the qubit with essentially 100% fidelity (see e.g., FIG. 1B).

When a single laser beam resonant with the $|\uparrow\rangle\leftrightarrow|e\rangle$ transition is applied, a closed cycling optical transition causes an ion in the $|\uparrow\rangle$ state to fluoresce strongly while an ion in the $|\downarrow\rangle$ state stays dark because the laser frequency is far from its resonance (see e.g., FIG. 1C). The collection of even a small fraction of this fluorescence allows for the detection of the atomic qubit state with near-perfect efficiency or accuracy. Other atomic species may have similar initialization/detection schemes.

In FIGS. 1B and 1C, all allowed transitions from the excited electronic states $|e\rangle$ and $|e'\rangle$ 140 are illustrated as downward, wavy arrows. On the other hand, the applied laser radiation (which is shown as upward, straight arrows) drive these transitions for initialization to state $|\downarrow\rangle$ as shown in FIG. 1B, and for fluorescence detection of the qubit state ($|\uparrow\rangle$=fluorescence, $|\downarrow\rangle$=no fluorescence) as shown in FIG. 1C.

Performing quantum processing using the types of qubits described in FIGS. 1A-1C requires the use of laser beams to control phase, frequency, amplitude, and/or polarization of quantum information in the qubits. In order to do so efficiently, it is important to overcome some existing limitations in the way the laser beams are manipulated. In this disclosure, the terms "laser," "laser beam," "optical beam," and "beam" may be used interchangeably.

AOMs are devices that may be used in quantum computing applications based on atoms and ionized atoms to manipulate or control the frequency, phase, amplitude, and/or polarization of lasers, which in turn are used to manipulate quantum information in the atom(s). An RF signal and a laser beam are both applied to the AOM and the RF signal gets imprinted ("modulated") onto a portion of the laser beam. That portion of the laser beam is deflected ("diffracted") by the AOM from an unaffected portion of the laser beam and can be spatially separated.

Pairs of modulated beams often need to be applied simultaneously to the same atom(s) to generate the required manipulation of the quantum information. An AOM can generate multiple manipulated laser beams by applying the sum of two or more RF signals (rather than a single RF signal as described above), where each RF signal is associated with a particular frequency (e.g., f1, f2, etc.). However, if the two or more laser beams have different frequencies, then the two modulated beams do not overlap after they are diffracted by the AOM. The laser beams can be "refocused" (or re-imaged) onto the atom or ion so that both beams would overlap at the atom or ion, but the directions at which the two laser beams arrive at the atom or ion are not likely to coincide (e.g., the laser beams are not co-propagating). This misalignment between the propagation direction of the two laser beams can cause errors in the quantum state manipulations.

Figure 2:
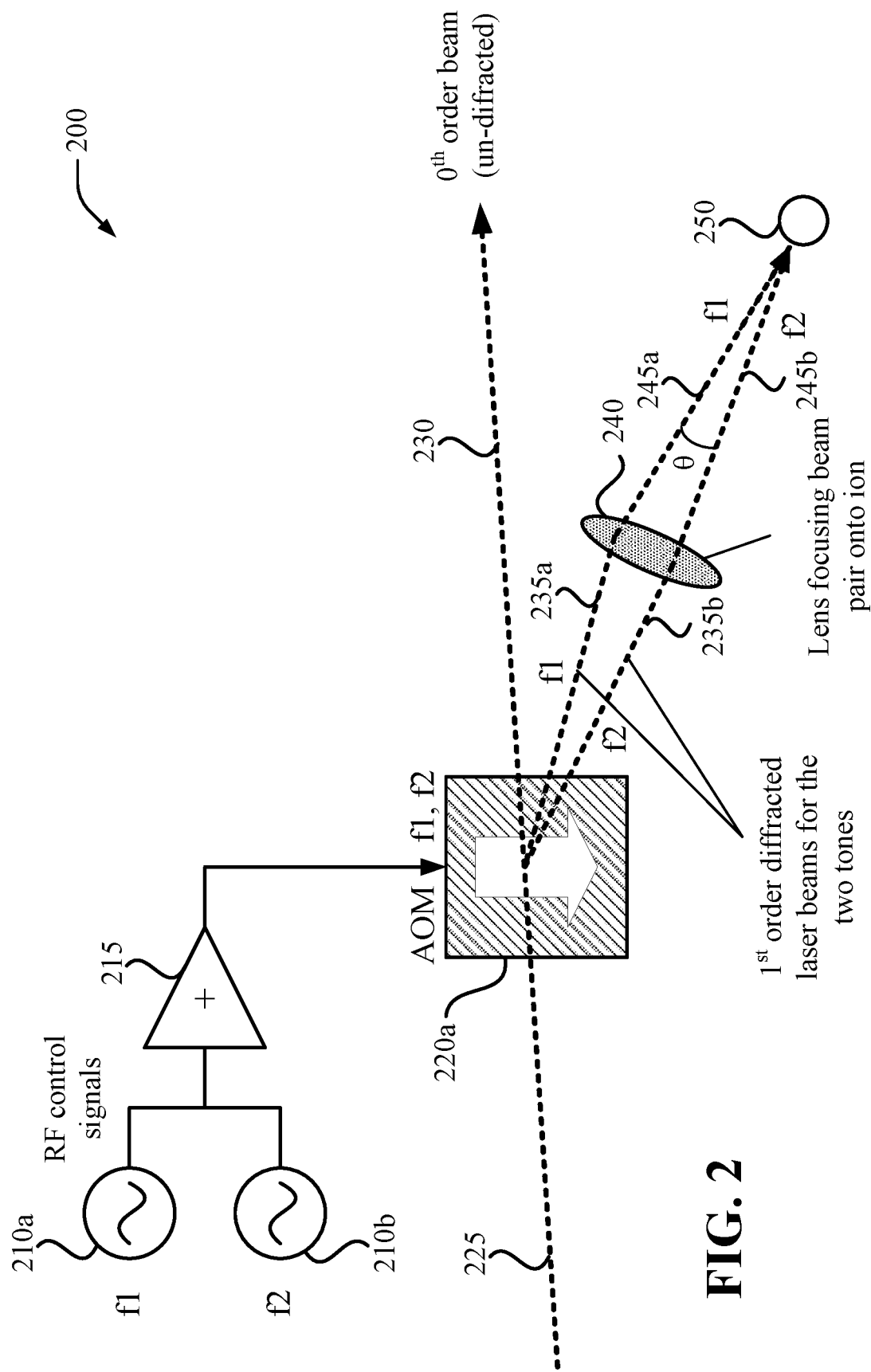
FIG. 2 is a diagram that illustrates an example of frequency dependence of diffracted laser beams.

FIG. 2 shows a diagram 200 that illustrates an example of frequency dependence of diffracted laser beams as described above. In this example, a first RF signal (e.g., a modulated signal) is generated by RF generator 210a based on frequency or tone f1 and a second RF signal is generated by RF generator 210b based on frequency or tone f2. These two signals are combined by adder 215 and applied to AOM 220a.

The AOM 220a receives an incident laser beam 225, part of which is not diffracted (e.g., un-diffracted laser beam 230 produced by $0^{th}$ order diffraction). On the other hand, the part of the incident laser beam 225 that is diffracted by the AOM 220a produces two modulated laser beams (e.g., diffracted laser beam 235a for tone f1 and diffracted laser beam 235b for tone f2, both produced by $1^{st}$ order diffraction—higher order diffracted beams can be spatially filtered) . The two diffracted laser beams are diffracted at different angles because of the different tones and do not co-propagate. Accordingly, the two diffracted laser beams need to be focused by optical element 240 (e.g., focused laser beam 245a for f1 and focused laser beam 245b for f2) onto a respective ion or atom 250 in a lattice or crystal formed in an ion trap for quantum processing. The refocused laser beams do not arrive at the ion or atom 250 in the same propagating direction (e.g., are not co-propagating), as illustrated by the angle θ, and this can cause errors in the quantum state manipulations.

To address some of the limitations in the configuration shown in the diagram 200 of FIG. 2, two configurations for reducing or eliminating the frequency dependence of the diffracted beam angle and allowing for overlapping or near-overlapping beams with two or more shift frequencies are described below. These configurations can be applied to both single beam scenarios and multi-beam scenarios. Reducing or eliminating the frequency dependence of the diffracted beam angle may involve having the laser beams that reach a particular ion or atom have a same or substantially the same propagation direction (e.g., are co-propagating).

Figure 3:
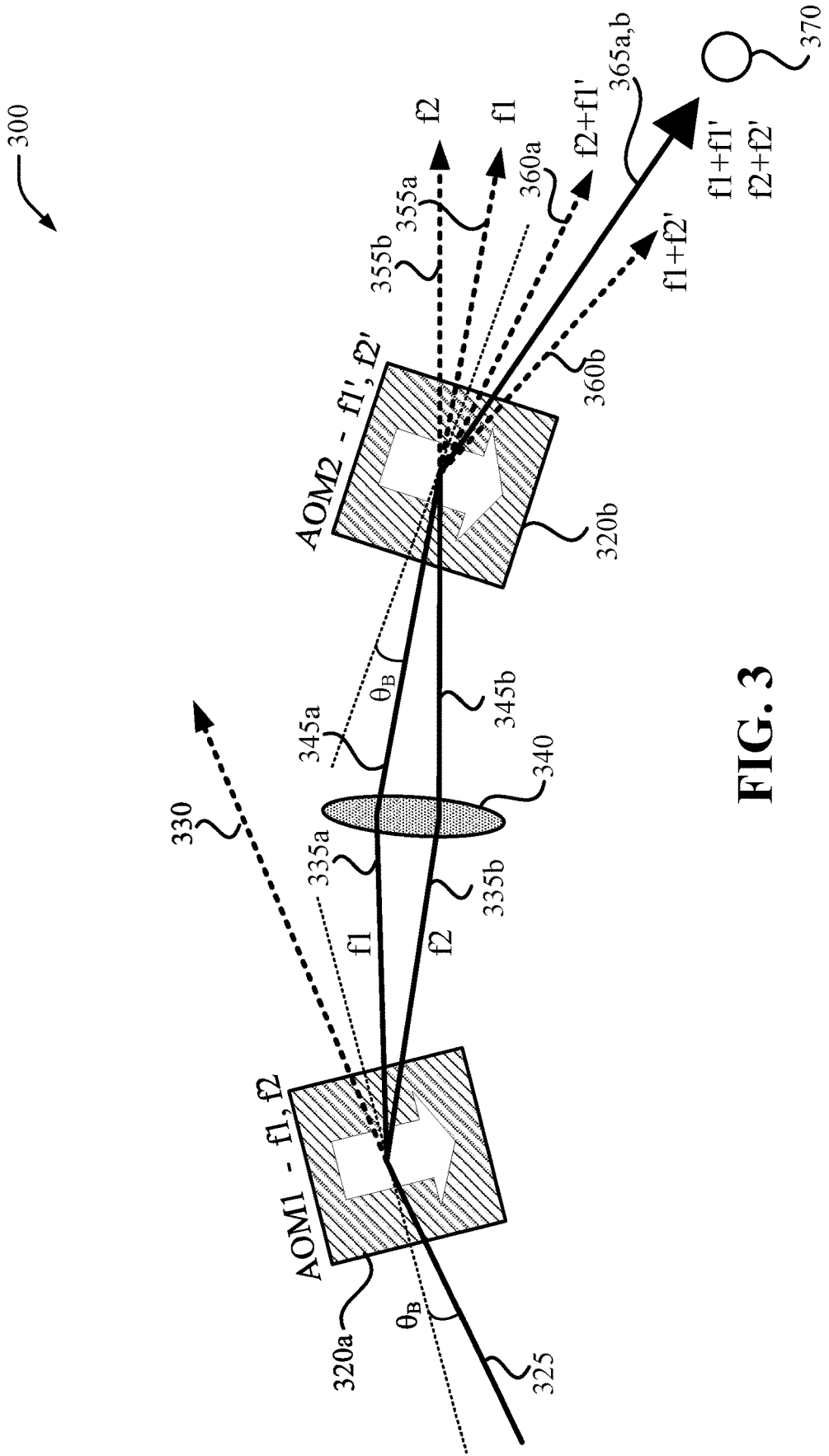
FIG. 3 is a diagram that illustrates an example of an unfolded AOM configuration for a single channel in accordance with aspects of this disclosure.

FIG. 3 shows a diagram 300 that illustrates an example of an unfolded AOM configuration for a single channel in accordance with aspects of this disclosure. The configuration in the diagram 300 is based on an "unfolded" version of the common double-pass AOM configuration. In the unfolded configuration, a lens or optical element refocuses the divergent beams from a first AOM into a second AOM. The diagram 300 shows two tones applied to each of the AOM's, although a similar approach can be followed when more than two tones or frequencies are being used.

In the folded configuration, a single AOM is used and optics are needed to pass the diffracted laser beams back through the same AOM for a second pass. Separating the second pass diffracted laser beam from the original, incoming laser beam requires either misaligning the laser beams from the optimal diffraction path to spatially separate the laser beams or rotating the polarization of the first pass diffracted laser beam and then using polarization selection to separate the laser beams. In both methods, there can be residual undiffracted light that leaks into the nominally diffraction only laser beam due to the imperfect spatial separation in the first case and imperfect polarization control in the second. This leads to non-frequency shifted leakage into the nominally diffracted laser beam. It also leads to light exiting the double pass AOM configuration when the AOM is turned off. Accordingly, one of the benefits of using an unfolded AOM configuration is the avoidance of the cross-talk caused by light leakage and for better on-off isolation. Also, in both methods, the second pass through the AOM is not optimal because of the laser beam misalignment in the first method and because of the polarization dependence of the AOM in the second method. Consequently, another benefit or advantage of the unfolded AOM configuration is the increased power efficiency compared to the single AOM approach. That is, by having two AOMs, it is possible to perform optimizations that enhance the overall power efficiency of the operation.

In the example in FIG. 3, two RF signals (e.g., modulated signals) based on tones f1 and f2 are generated and provided to AOM1 320a, while two other RF signals based on tones f1' and f2' are generated and provided to AOM2 320b.

The AOM 320a receives an incident laser beam 325 at a Bragg angle (θB), part of which is not diffracted (e.g., un-diffracted laser beam 330). On the other hand, the part of the incident laser beam 325 that is diffracted at the AOM 320a produces two modulated laser beams (e.g., diffracted laser beam 335a for tone f1 and diffracted laser beam 335b for tone f2). The two diffracted laser beams are diffracted at different angles and do not co-propagate. Accordingly, the two diffracted laser beams need to be focused by optical element 340 (e.g., focused laser beam 345a for f1 and focused laser beam 345b for f2) onto AOM2 320b to match the Bragg angles of the laser beams with respect to AOM2 302b.

The AOM2 320b produces multiple output paths, that is, the AOM2 320b produces multiple diffracted laser beams in different propagation directions from the two incident laser beams (e.g., focused laser beam 345a and focused laser beam 345b) along with the undiffracted portion 355a and 355b of the incident laser beams 345a and 245b. For example, a diffracted laser beam 360a is produced based on tone combination f2+f1' and a diffracted laser beam 360b is produced based on tone combination f1+f2', where each of these diffracted laser beams is diffracted at a different angle. Also produced by AOM2 320b are diffracted laser beam 365a based on tone combination f1+f1' and diffracted laser beam 365b based on tone combination f2+f2' (illustrated as "365a, b" in FIG. 3), which are diffracted at a different angle from the other diffracted laser beams, and where both have the same or substantially the same propagating direction (e.g., they are overlapping laser beams). In this disclosure, the terms substantially, approximately, about, and the same may refer to a value of two or more numbers or of two or more parameters being within 0.1%, 0.25%, 0.5%, 1%, 2%, 3%, 5%, or 10% of each other, or within a 1-10% range of each other. It is possible to isolate or separate diffracted laser beams 365a and 365b from the other diffracted laser beams produced by AOM2 320b to use the diffracted laser beams 365a and 365b to manipulate the quantum information of a qubit 370 (e.g., atom or ion in an ion trap). That is, the diffracted laser beams 365a and 365b are co-propagating or substantially co-propagating gate beams used to enable or implement quantum gate operations.

In this example, if f1'=f1 and f2'=f2, one of the output paths from the AOM2 320b has two overlapping beams with frequencies shifts 2*f1 and 2*f2 (e.g., the diffracted laser beams 365a and 365b). The diffracted laser beams generated by the "cross-term" f2+f1 diffract at a different angle and the f1+f1'=2*f1 and f2+f2'=2*f2 laser beams (365a and 365b) can be isolated via spatial filtering. If f1' and f1 (f2' and f2) differ slightly but |f1'−f1| (|f2'−f2|) is a fraction of |f1−f2|, then the f1'+f1 and f2'+f2 laser beams are only nearly-overlapping but remain sufficiently angularly separated from the cross terms (diffracted laser beams 360a and 360b) that the f1'+f1 and f2'+f2 laser beams (365a and 365b) can be isolated.

In an example, the values of f1 and f1' (f2 and f2') are approximately 185 MHz (215 MHz), with the differences |f1−f1'| and |f2−f2'| are approximately 1 MHz.

A variation from the example shown in FIG. 3 includes an implementation in which both AOMs in the unfolded configurations are multi-channel AOMs, with each channel receiving its independent set of f1, f2, f1', and f2'. This configuration allows for each channel to have the condition f1=f1' and f2=f2' and, thus, fully overlapping output beams for the two (or more) tones from each channel.

In the case where f1 and f2 are not the same as f1' and f2', respectively, it may be possible to have a situation where AOM1 320a or AOM2 320b can be a multi-channel AOM while the other can be a single channel AOM, such as a large aperture AOM. For example, an implementation can include having the first AOM in the unfolded configuration be a large aperture AOM and the second AOM be a multi-channel AOM. In this implementation, f1 and f2 are common among all output channels of the first AOM and f1' and f2' is individual to each channel of the second AOM. A similar implementation can have the first AOM in the unfolded configuration be a multi-channel AOM and the second AOM be a large aperture AOM. In this implementation, f1 and f2 is individual to each output channel of the first AOM and f1' and f2' are common among all channels in the second AOM. Examples of these implementations are provided below in connection with FIGS. 4-6.

Figure 4:
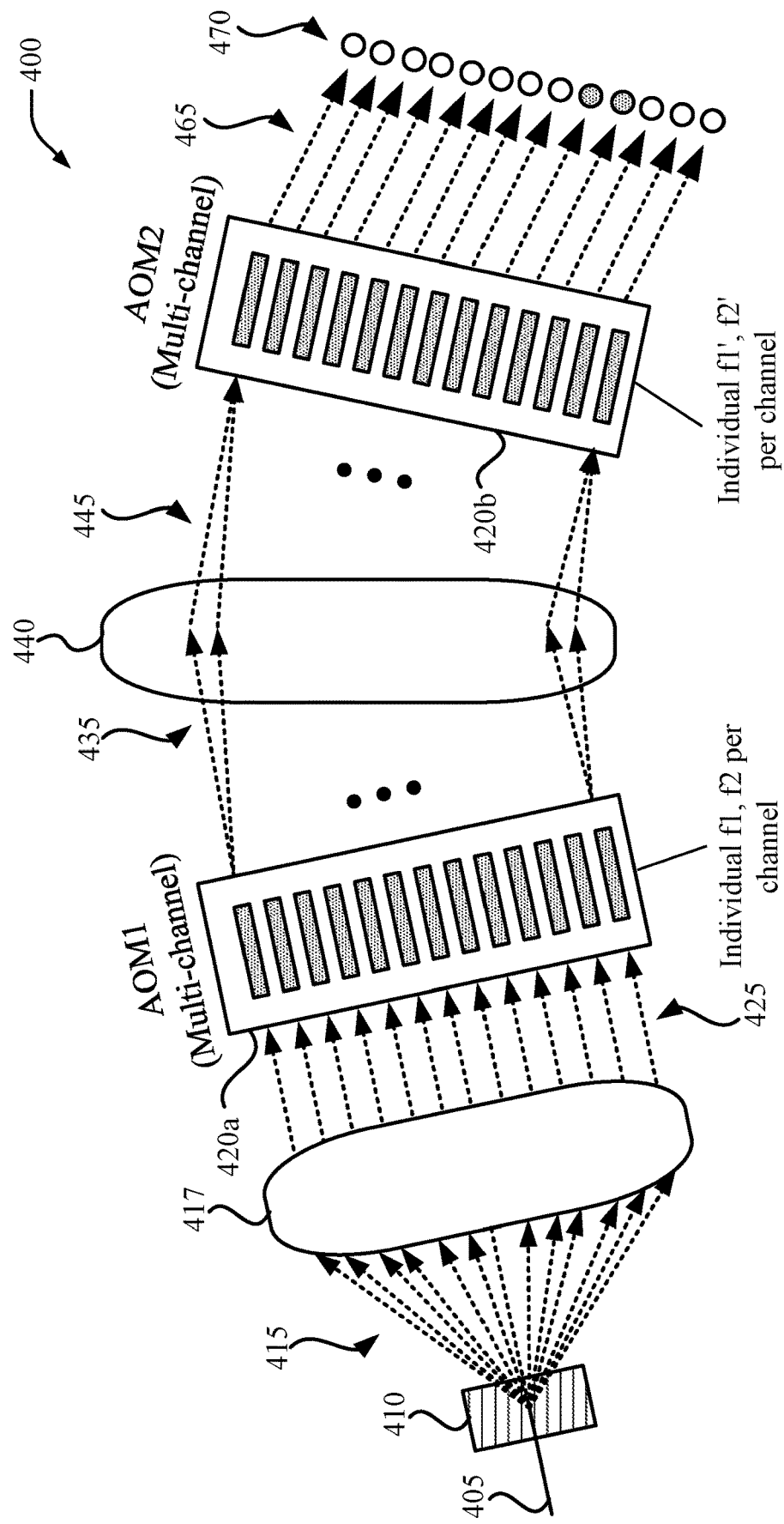
FIG. 4 is a diagram that illustrates an example of an unfolded AOM configuration using multi-channel AOMs in accordance with aspects of this disclosure.

FIG. 4 shows a diagram 400 that illustrates an example of an unfolded AOM configuration using multi-channel AOMs in accordance with aspects of this disclosure. In this example, an incident laser beam 405 is provided to a diffractive optical element (DOE) 410 to generate a fan of laser beams 415. The laser beams 415 are collimated by an optical element 417 and the collimated laser beams 425 are provided to a first AOM in the unfolded configuration, AOM1 420a. The AOM1 420a is a multi-channel AOM with N channels (e.g., N>30), where N is an integer number that is the same or possibly larger than a number of ions in a set of ions 470 to be manipulated or controlled.

Each channel of the AOM1 420a can have a respective pair of RF signals applied (e.g., pair of RF signals imparted on a channel and based on individual f1 and f2 tones for that channel). Each channel of the AOM1 420a can produce a pair of diffracted laser beams 435 based on f1, f2 that are focused by an optical element 440 to produce focused laser beams 445, which are provided to a second AOM in the unfolded configuration, AOM2 420b.

The AOM2 420b can then, for each channel, generate multiple output paths, one of which includes a pair of diffracted laser beams 465 that are co-propagating or substantially co-propagating at their respective ion in the set of ions 470. These laser beams can be spatially isolated from others that are also generated by the AOM2 420b. Just like the AOM1 420a, each channel of the AOM2 420b can have a respective pair of RF signals applied (e.g., pair of RF signals imparted on a channel and based on individual f1' and f2' tones for that channel).

The optical elements 417 and 440 can each be a single optical component (e.g., lens) or a combination of multiple optical components (e.g., multiple lenses) that may include at least one optical stage.

The diagram 400 is provided by way of illustration and not of limitation. It is to be understood that, in general, the diffracted laser beams produced by the AOM1 420a and the AOM2 420b are produced in a direction perpendicular to the channel and in this example out of the plane in FIG. 4. Accordingly, the diagram 400 is intended to capture a conceptual or schematic representation in two dimensions of a three-dimensional unfolded AOM configuration.

Figure 5A:
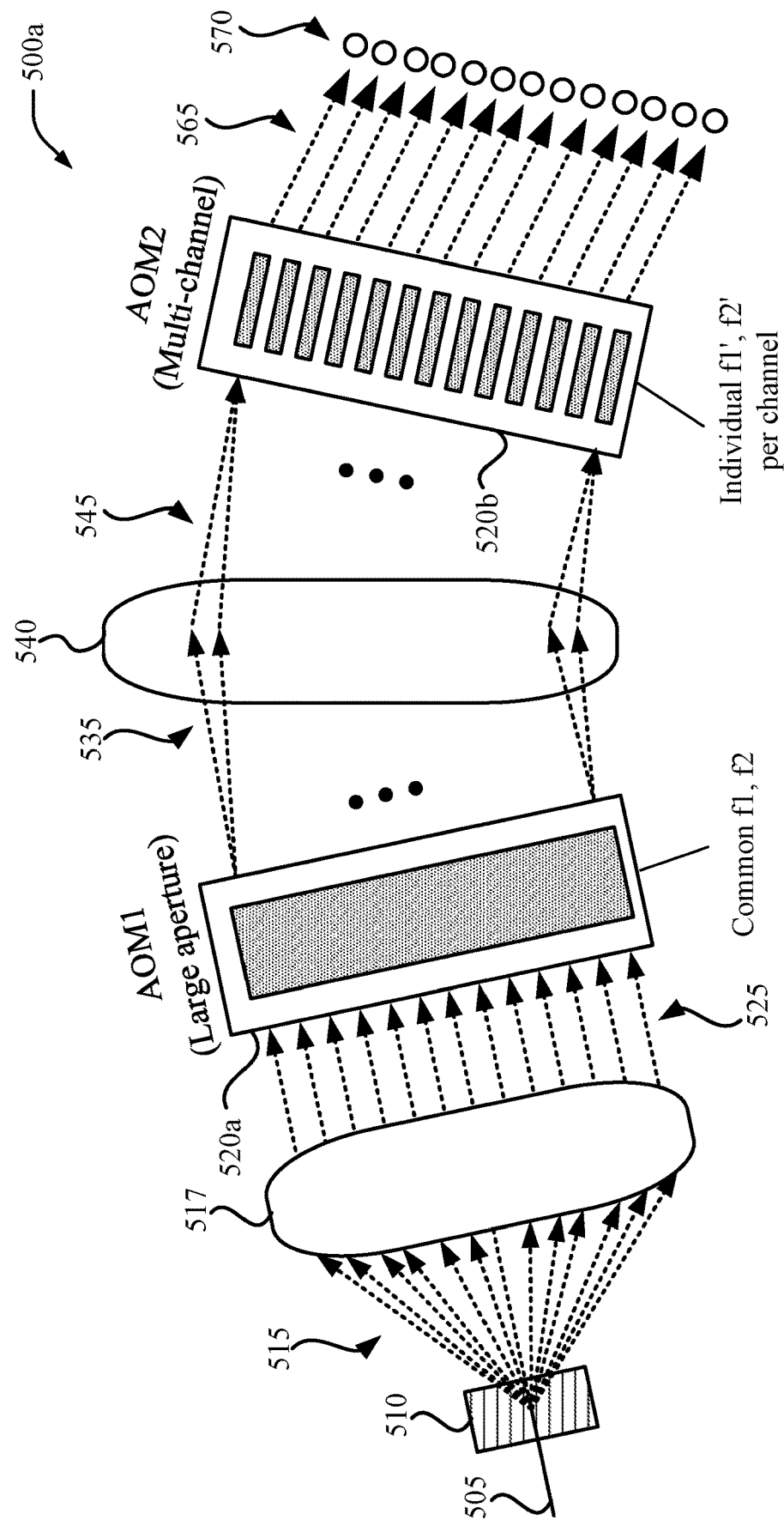
FIGS. 5A and 5B are diagrams that illustrate examples of an unfolded AOM configuration in which one AOM is a multi-channel AOM and the other AOM is a large aperture AOM in accordance with aspects of this disclosure.
Figure 5B:
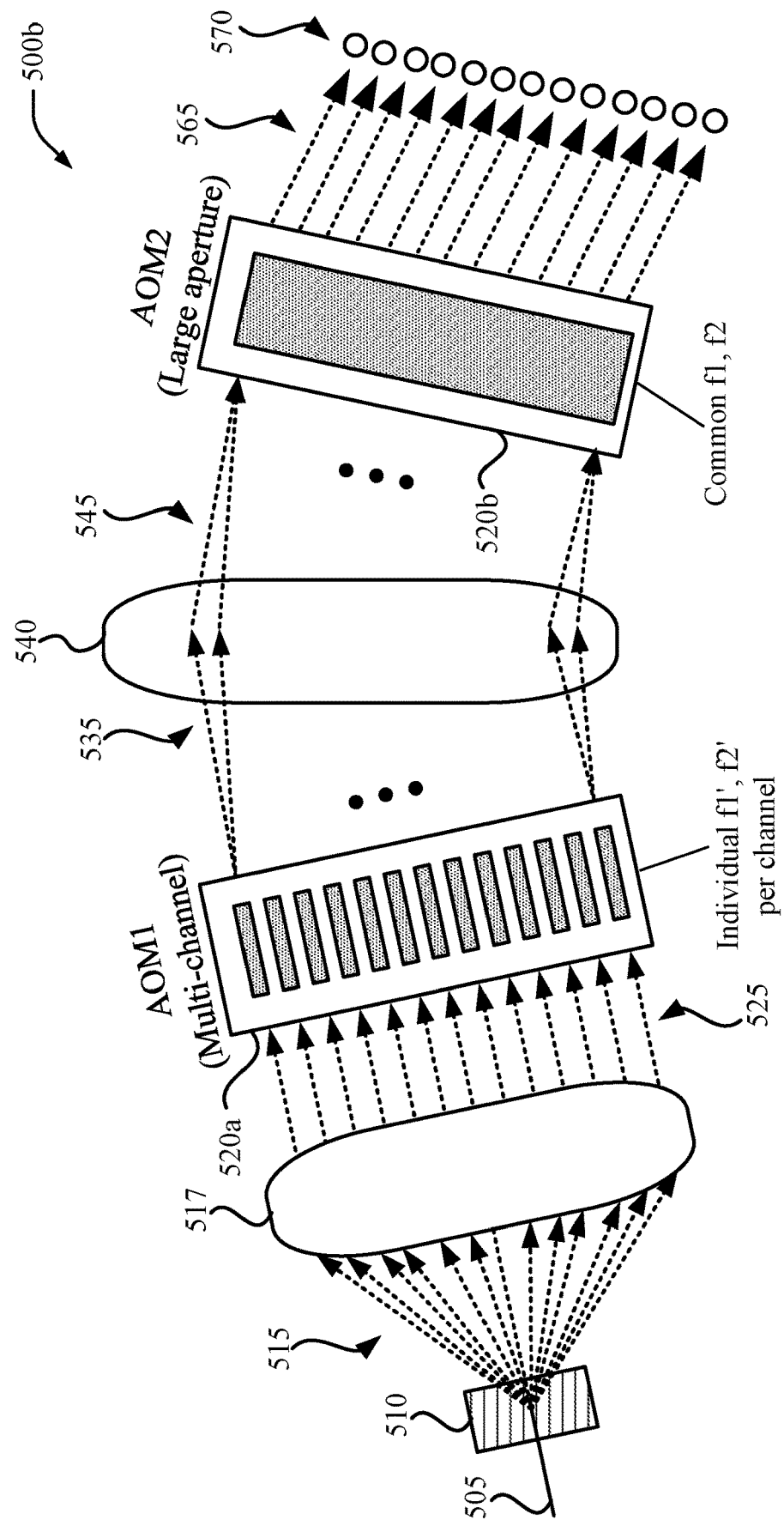

FIGS. 5A and 5B show diagrams 500a and 500b, respectively, that illustrate examples of an unfolded AOM configuration in which one AOM is a multi-channel AOM and the other AOM is a large aperture AOM in accordance with aspects of this disclosure. The diagram 500a in FIG. 5A is substantially similar to the diagram 400 in FIG. 4 with the one difference being that the first AOM in the unfolded configuration, AOM1 520a, is a single channel, large aperture AOM. In this example, there is an incident laser beam 505, a DOE 510, a fan of laser beams 515, an optical element 517, collimated laser beams 525, the large aperture AOM1 520a, diffracted laser beams 535, an optical element 540, focused laser beams 545, a multi-channel AOM2 520b, and pairs of diffracted laser beams 465 that are co-propagating or substantially co-propagating at their respective ion in the set of ions 570.

The large aperture AOM1 520a operates based on common tones f1 and f2 for all incident laser beams while the multi-channel AOM2 520b operates based on individual f1' and f2' tones for each channel.

The diagram 500b in FIG. 5B is substantially similar to the diagram 500 in FIG. 5A with the one difference being that the second AOM in the unfolded configuration, AOM2 520b, is a single channel, large aperture AOM, while the first AOM, AOM 520a, is a multi-channel AOM. In this example, the multi-channel AOM1 520a operates based on individual f1 and f2 tones for each channel and the large aperture AOM2 520b operates on common tones f1' and f2' for all incident laser beams.

Like the diagram 400 above, the diagrams 500a and 500b are provided by way of illustration and not of limitation. It is to be understood that, in general, the diffracted laser beams produced by the AOM1 520a and the AOM2 520b are produced in a direction perpendicular to the channel and, in this example, out of the plane in FIGS. 5A and 5B. Accordingly, the diagrams 500a and 500b are intended to capture a conceptual or schematic representation in two dimensions of a three-dimensional unfolded AOM configuration.

Figure 6:
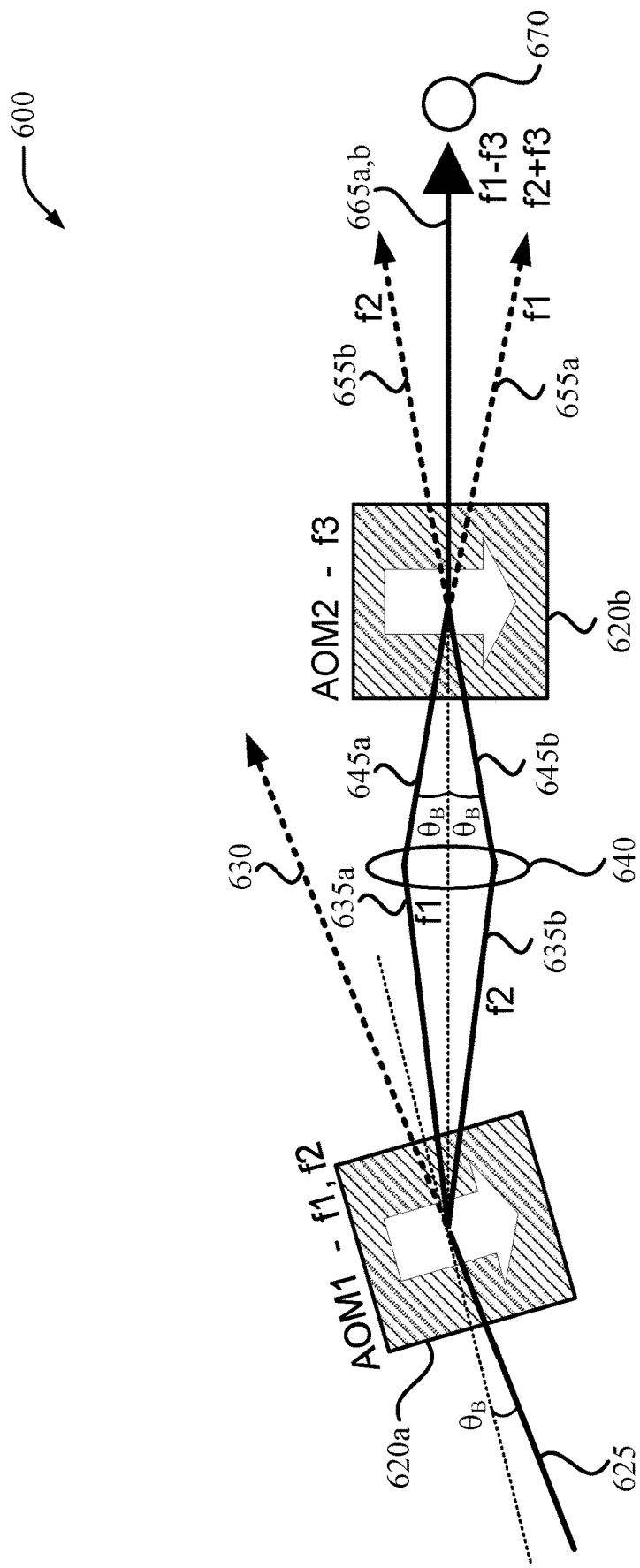
FIG. 6 is a diagram that illustrates another example of an unfolded AOM configuration in accordance with aspects of this disclosure.

FIG. 6 shows a diagram 600 that illustrates another example of an unfolded AOM configuration in accordance with aspects of this disclosure. In this example, two RF signals (e.g., modulated signals) based on tones f1 and f2 are generated and provided to an AOM1 620a, while a single RF signal based on tone f3 is generated and provided to an AOM2 620b. AOM 620a receives an incident laser beam 625 at a Bragg angle ($\theta_B$), part of which is not diffracted (e.g., un-diffracted laser beam 630). On the other hand, the part of the incident laser beam 625 that is diffracted at the AOM 620a produces two modulated laser beams (e.g., diffracted laser beam 635a for tone f1 and diffracted laser beam 635b for tone f2). The two diffracted laser beams are diffracted at different angles and do not co-propagate.

The two diffracted laser beams (635a, 635b) are refocused onto opposite Bragg angle paths ($\theta_B$) into AOM2 620b by an optical element 640. As described above, the AOM2 620b has a single tone f3 applied and produces multiple diffracted laser beams. The f1 beam (diffracted laser beam 665a) is diffracted into the −1 order, acquiring a net f1−f3 shift, and the f2 beam (diffracted laser beam 665b) is diffracted into the +1 order, acquiring a net f2+f3 shift. These two laser beams are overlapping laser beams. Also produced are diffracted laser beam 655a based on tone f1 and diffracted laser beam 655b based on tone f2, both of which can be spatially filtered from the overlapping laser beams 665a and 665b.

Unlike some of the configurations described above, this configuration has to be physically tuned for frequencies or tones f1 and f2. For small deviations in f1 and f2 from the tuned values, the overlapping output laser beams (e.g., f1−f3 and f2+f3) will slightly diverge. The tone f3 can then be adjusted to minimize the divergence. In the particular case where f1 and f2 shift to f1+d and f2−d for a given frequency d, the output beams from AOM1 620a will symmetrically contract (for d>0) or expand (for d<0) around the axis of the AOM2 620b and f3 can be adjusted to fully overlap the output beams.

Similar to the examples described above, the configuration shown in FIG. 6 can be implemented using two multi-channel AOMs, or one multi-channel AOM and one large aperture AOM.

Another issue that needs consideration is the manipulation or control of polarization. Fine, rapid control of the light polarization can allow for reduced systematics in the quantum operations. The main method for such control are electro-optic modulators (EOMs), which suffer from polarization drift. An alternative to EOMs that would reduce or eliminate this drift would provide a powerful tool for quality quantum operations. Below are described various aspects of controlling laser beam polarization using the polarization dependence of an AOM instead of an EOM.

Figure 7A:
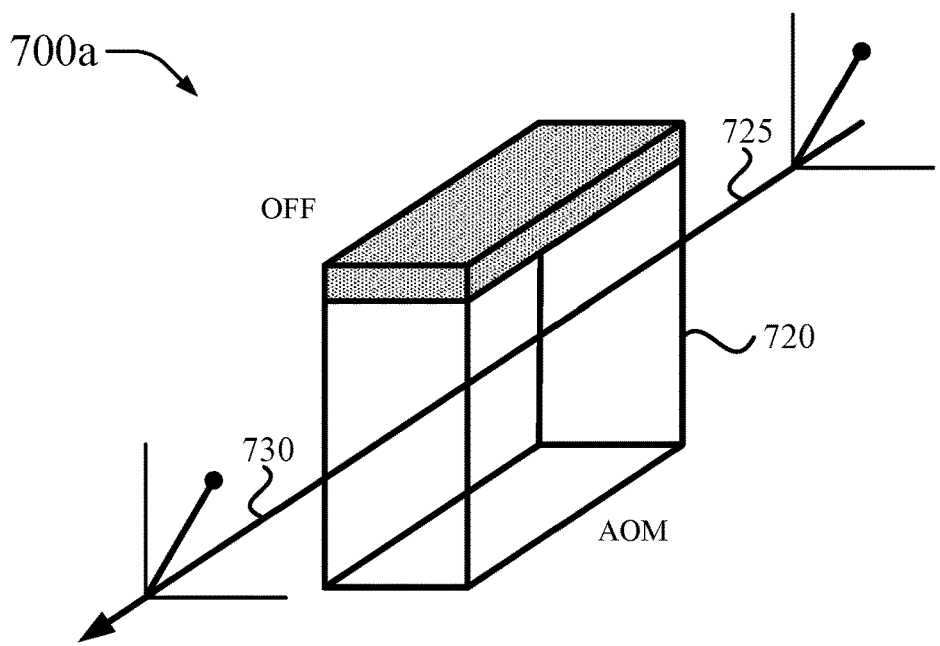
FIGS. 7A, 7B, and 7C are diagrams that illustrate an example of polarization control using an AOM in accordance with aspects of this disclosure.
Figure 7B:
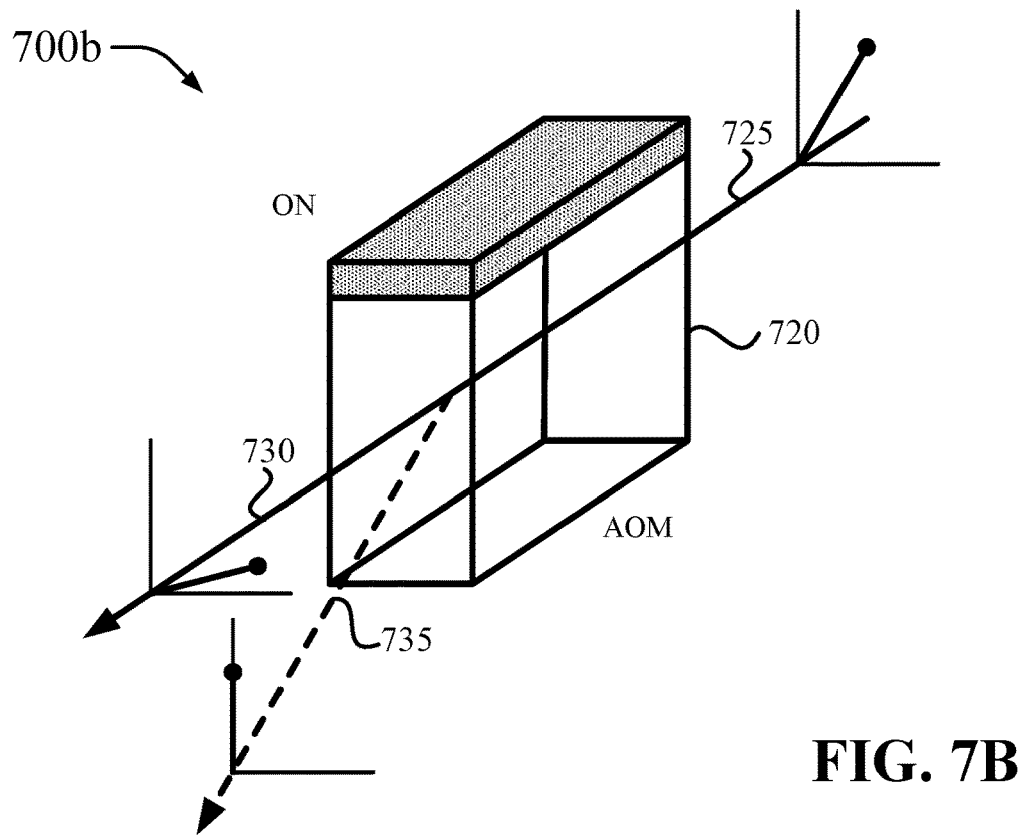

FIGS. 7A and 7B show diagrams 700a and 700b, respectively, that illustrate an example of polarization control using an AOM in accordance with aspects of this disclosure. Small polarization adjustments (e.g., slight rotations of less than 90°) are sometimes needed for quantum control of the qubits. Without the ability to perform such small adjustments, efficiency of the qubit control is likely to be reduced. Small polarization rotations may be performed with electro-optic modulators (EOMs), but these tend to drift and do not perform well for ultraviolet (UV) lasers such as the ones used for quantum processing. Pockels cells, which are based on electro-optic effects, do not work well for the type of small polarization adjustments needed in quantum processing. FIGS. 7A and 7B described the use of AOMs instead of EOMs for polarization control.

In FIG. 7A, the polarization of the incident light (e.g., incident laser beam 725) is linear and at an angle to the diffraction plane. With AOM 720 being OFF, the exiting un-diffracted laser beam 730 has the same polarization as the incident laser beam 725 (as illustrated by the line with the dot or circle at the end). In FIG. 7B, with the AOM 720 ON (e.g., with an RF signal applied to the AOM), some of the incident light is diffracted out of the incident laser beam 725 to produce a diffracted laser beam 735. Depending on the AOM material, the AOM will diffract one projection polarization more than the other. This preferentially suppresses one of the projections, causing the polarization of the un-diffracted laser beam 730 to rotate (as illustrated by the line with the dot or circle at the end). The amount of rotation can be controlled by varying the input power of the RF signal. The AOM-based polarization control can be applied to a laser beam before the laser beam is applied to an ion or atom to manipulate the quantum information stored in the ion or atom. That is, the polarization control technique described herein may be application with the AOM configurations described above to provide frequency, phase, amplitude, and polarization control. For example, the polarization control techniques may be applied to co-propagating laser beams that are to be incident on an ion or atom in a trap.

Figure 7C:
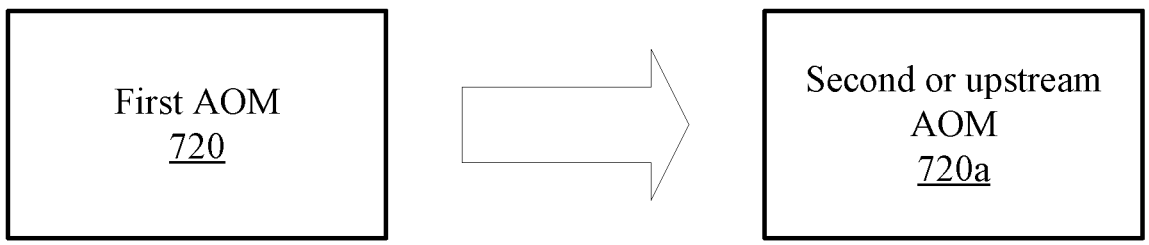

FIG. 7C shows a diagram 700 in which the AOM 720 in FIGS. 7A and 7B is a first AOM 720 and there is a second or upstream AOM 720a as well for controlling the overall power of the un-diffracted laser beam. In an example, the upstream AOM 720a may be operated in a similar manner as the AOM 720.

The various aspects described above for AOM configurations for quantum processing, along with the related examples described in connection with FIGS. 2-7C, can be performed as methods or processes by different devices or systems. Additional details of such methods, processes, devices, or systems are further described below.

Figure 8:
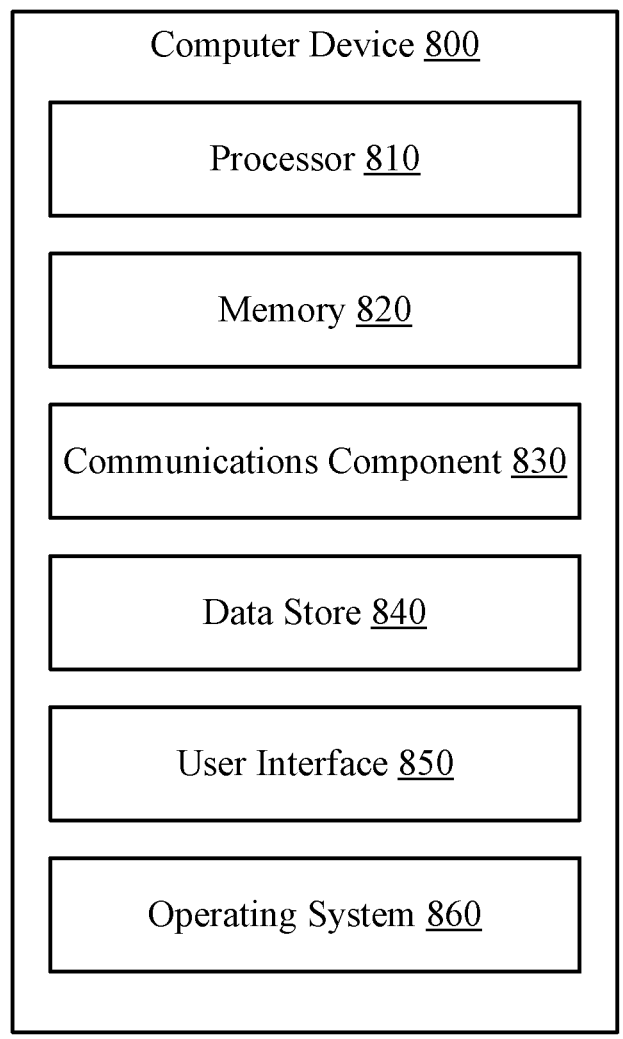
FIG. 8 is a diagram that illustrates an example of a computer device in accordance with aspects of this disclosure.

Referring now to FIG. 8, illustrated is an example computer device 800 in accordance with aspects of the disclosure. The computer device 800 can represent a single computing device, multiple computing devices, or a distributed computing system, for example. The computer device 800 may be configured as a quantum computer (e.g., a quantum information processing (QIP) system), a classical computer, or a combination of quantum and classical computing functions. For example, the computer device 800 may be used to process information using quantum algorithms based on trapped ion technology and may therefore implement some of the techniques described in which different types of AOM configurations may be used for quantum processing. A generic example of the computer device 800 as a QIP system that can implement the techniques described herein is illustrated in an example shown in FIGS. 12A and 12B.

In one example, the computer device 800 may include a processor 810 for carrying out processing functions associated with one or more of the features described herein. For example, the processor 810 may be configured to control, coordinate, and/or perform aspects of manipulating quantum information stored in an ion or atom by using one or more of the AOM configurations or implementations described above. The processor 810 may include a single or multiple set of processors or multi-core processors. Moreover, the processor 810 may be implemented as an integrated processing system and/or a distributed processing system. The processor 810 may include a central processing unit (CPU), a quantum processing unit (QPU), a graphics processing unit (GPU), or combination of those types of processors. In one aspect, the processor 810 may refer to a general processor of the computer device 800, which may also include additional processors 810 to perform more specific functions. The processor 810 may involve using one or more trapped ions to perform quantum operations, algorithms, or simulations.

In an example, the computer device 800 may include a memory 820 for storing instructions executable by the processor 810 for carrying out the functions described herein. In an implementation, for example, the memory 820 may correspond to a computer-readable storage medium that stores code or instructions to perform one or more of the functions or operations described herein. In one example, the memory 820 may include instructions to perform aspects of a methods 900, 1000, and 1100 described below in connection with FIGS. 9, 10, and 11. Just like the processor 810, the memory 820 may refer to a general memory of the computer device 800, which may also include additional memories 820 to store instructions and/or data for more specific functions.

Further, the computer device 800 may include a communications component 830 that provides for establishing and maintaining communications with one or more parties utilizing hardware, software, and services as described herein. The communications component 830 may carry communications between components on the computer device 800, as well as between the computer device 800 and external devices, such as devices located across a communications network and/or devices serially or locally connected to computer device 800. For example, the communications component 830 may include one or more buses, and may further include transmit chain components and receive chain components associated with a transmitter and receiver, respectively, operable for interfacing with external devices.

Additionally, the computer device 800 may include a data store 840, which can be any suitable combination of hardware and/or software, that provides for mass storage of information, databases, and programs employed in connection with implementations described herein. For example, the data store 840 may be a data repository for operating system 860 (e.g., classical OS, or quantum OS). In one implementation, the data store 840 may include the memory 820.

The computer device 800 may also include a user interface component 850 operable to receive inputs from a user of the computer device 800 and further operable to generate outputs for presentation to the user or to provide to a different system (directly or indirectly). The user interface component 850 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 850 may include one or more output devices, including but not limited to a display, a speaker, a haptic feedback mechanism, a printer, any other mechanism capable of presenting an output to a user, or any combination thereof.

In an implementation, the user interface component 850 may transmit and/or receive messages corresponding to the operation of the operating system 860. In addition, the processor 810 may execute the operating system 860 and/or applications or programs, and the memory 820 or the data store 840 may store them.

When the computer device 800 is implemented as part of a cloud-based infrastructure solution, the user interface component 850 may be used to allow a user of the cloud-based infrastructure solution to remotely interact with the computer device 800.

Figure 9:
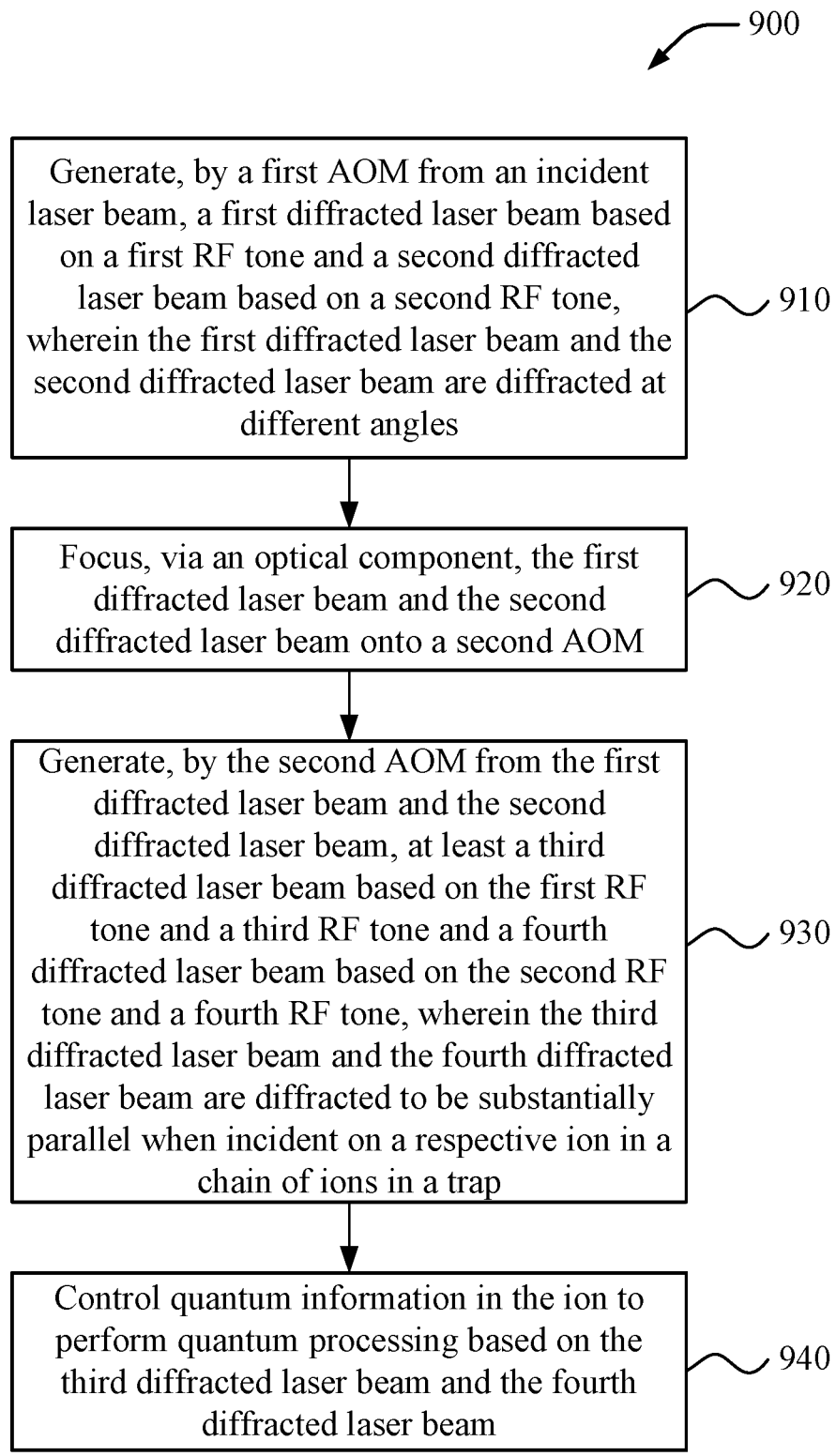
FIGS. 9, 10, and 11 are flow diagrams that illustrate examples of methods in accordance with aspects of this disclosure.

FIG. 9 is a flow diagram that illustrates an example of a method 900 for controlling laser beam propagation in quantum processing in accordance with aspects of this disclosure. In an aspect, the method 900 may be performed in a computer system (e.g., as part of the operations of the computer system) such as the computer device 800 described above, where, for example, the processor 810, the memory 820, the data store 840, and/or the operating system 860 may be used to perform or control the functions of the method 900. Similarly, the functions of the method 900 may be performed or controlled by one or more components of a QIP system such as the QIP system 1200 and its components (e.g., optical controller 1220 and its subcomponents) described in more detail below in connection with FIGS. 12A and 12B. Aspects of the method 900 may be described in connection with the AOM configurations or implementations in at least FIGS. 3-5B.

At 910, the method 900 includes generating, by a first AOM from an incident laser beam, a first diffracted laser beam based on a first RF tone and a second diffracted laser beam based on a second RF tone, wherein the first diffracted laser beam and the second diffracted laser beam are diffracted at different angles.

At 920, the method 900 includes focusing, via an optical component, the first diffracted laser beam and the second diffracted laser beam onto a second AOM.

At 930, the method 900 includes generating, by the second AOM from the first diffracted laser beam and the second diffracted laser beam, at least a third diffracted laser beam based on the first RF tone and a third RF tone and a fourth diffracted laser beam based on the second RF tone and a fourth RF tone, wherein the third diffracted laser beam and the fourth diffracted laser beam are diffracted to be substantially parallel when incident on a respective ion in a chain of ions in a trap.

At 940, the method 900 includes controlling quantum information in the ion to perform quantum processing based on the third diffracted laser beam and the fourth diffracted laser beam.

In an aspect of the method 900, the first RF tone is the same as the third RF tone, the second RF tone is the same as the fourth RF tone, and the third diffracted laser beam and the fourth diffracted laser beam are co-propagating at the respective ion.

In an aspect of the method 900, the first RF tone is different from the third RF tone, the second RF tone is different from the fourth RF tone, and the third diffracted laser beam and the fourth diffracted laser beam are substantially co-propagating at the respective ion.

In an aspect of the method 900, the method further includes generating a first RF control signal based on the first RF tone; generating a second RF control signal based on the second RF tone; generating a third RF control signal based on the third RF tone; generating a fourth RF control signal based on the fourth RF tone; providing the first RF control signal and the second RF control to the first AOM to generate the first diffracted laser beam and the second diffracted laser beam; and providing the third RF control signal and the fourth RF control to the second AOM to generate the first diffracted laser beam and the second diffracted laser beam.

In an aspect of the method 900, generating at least the third diffracted laser beam and the fourth diffracted laser beam includes generating a fifth diffracted laser beam based on the first RF tone and the fourth RF tone and a sixth diffracted laser beam based on the second RF tone and the third RF tone, and the method further includes isolating the third diffracted laser beam and the fourth diffracted laser beam from the fifth diffracted laser beam and the sixth diffracted laser beam by spatial filtering.

In an aspect of the method 900, each of the first AOM and the second AOM is a multi-channel AOM, each channel in the first AOM has a respective first RF tone and second RF tone, and each channel in the second AOM has a respective third RF tone and fourth RF tone.

In an aspect of the method 900, the first AOM is a multi-channel AOM and the second AOM is a single-channel AOM, or the first AOM is a single-channel AOM and the second AOM is a multi-channel AOM.

In an aspect of the method 900, the first AOM is a large aperture AOM and the second AOM is a multi-channel AOM, the first RF tone and the second RF tone are common to all channels of the first AOM, and the third RF tone and the fourth RF tone are individually set for each of the channels of the second AOM.

In an aspect of the method 900, the first AOM is a multi-channel AOM and the second AOM is a large aperture AOM, the first RF tone and the second RF tone are individually set for each of the channels of the first AOM, and the third RF tone and the fourth RF tone are common to all channels of the second AOM.

Figure 10:
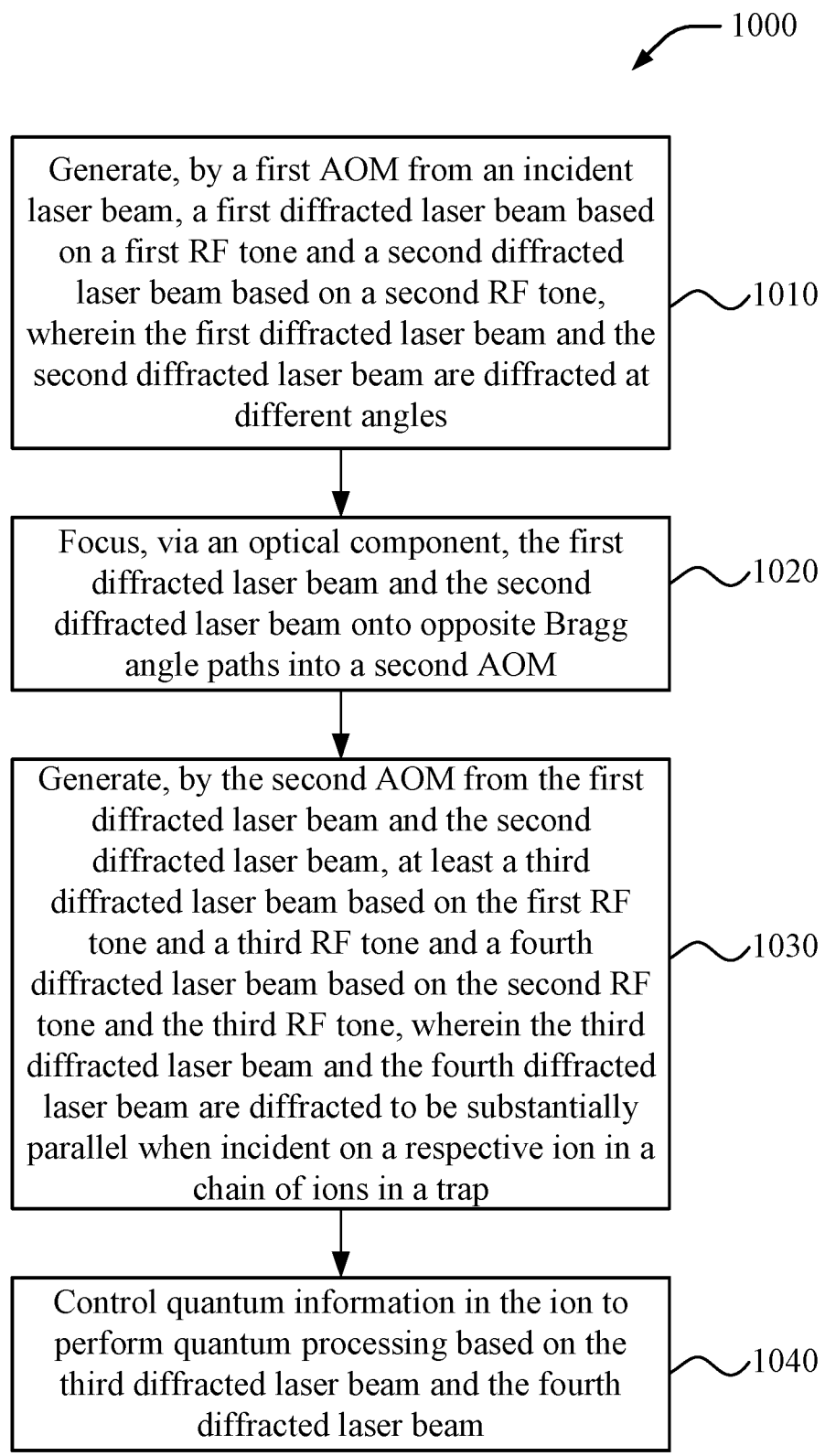

FIG. 10 is a flow diagram that illustrates an example of a method 1000 for controlling laser beam propagation in quantum processing in accordance with aspects of this disclosure. In an aspect, the method 1000 may be performed in a computer system (e.g., as part of the operations of the computer system) such as the computer device 800 described above, where, for example, the processor 810, the memory 820, the data store 840, and/or the operating system 860 may be used to perform or control the functions of the method 1000. Similarly, the functions of the method 1000 may be performed or controlled by one or more components of a QIP system such as the QIP system 1200 and its components (e.g., optical controller 1220 and its subcomponents) described in more detail below in connection with FIGS. 12A and 12B. Aspects of the method 1000 may be described in connection with the AOM configurations or implementations in at least FIG. 6.

At 1010, the method 1000 includes generating, by a first AOM from an incident laser beam, a first diffracted laser beam based on a first RF tone and a second diffracted laser beam based on a second RF tone, wherein the first diffracted laser beam and the second diffracted laser beam are diffracted at different angles.

At 1020, the method 1000 includes focusing, via an optical component, the first diffracted laser beam and the second diffracted laser beam onto opposite Bragg angle paths into a second AOM.

At 1030, the method 1000 includes generating, by the second AOM from the first diffracted laser beam and the second diffracted laser beam, at least a third diffracted laser beam based on the first RF tone and a third RF tone and a fourth diffracted laser beam based on the second RF tone and the third RF tone, wherein the third diffracted laser beam and the fourth diffracted laser beam are diffracted to be substantially parallel when incident on a respective ion in a chain of ions in a trap.

At 1040, the method 1000 includes controlling quantum information in the ion to perform quantum processing based on the third diffracted laser beam and the fourth diffracted laser beam.

In an aspect of the method 1000, each of the first AOM and the second AOM is a multi-channel AOM, each channel in the first AOM has a respective first RF tone and second RF tone, and each channel in the second AOM has a respective third RF tone.

In an aspect of the method 1000, the first AOM is a multi-channel AOM and the second AOM is a single-channel AOM, or the first AOM is a single-channel AOM and the second AOM is a multi-channel AOM.

In an aspect of the method 1000, the first AOM is a large aperture AOM and the second AOM is a multi-channel AOM, the first RF tone and the second RF tone are common to all channels of the first AOM, and the third RF tone is individually set for each of the channels of the second AOM.

In an aspect of the method 1000, the first AOM is a multi-channel AOM and the second AOM is a large aperture AOM, the first RF tone and the second RF tone are individually set for each of the channels of the first AOM, and the third RF tone is common to all channels of the second AOM.

Figure 11:
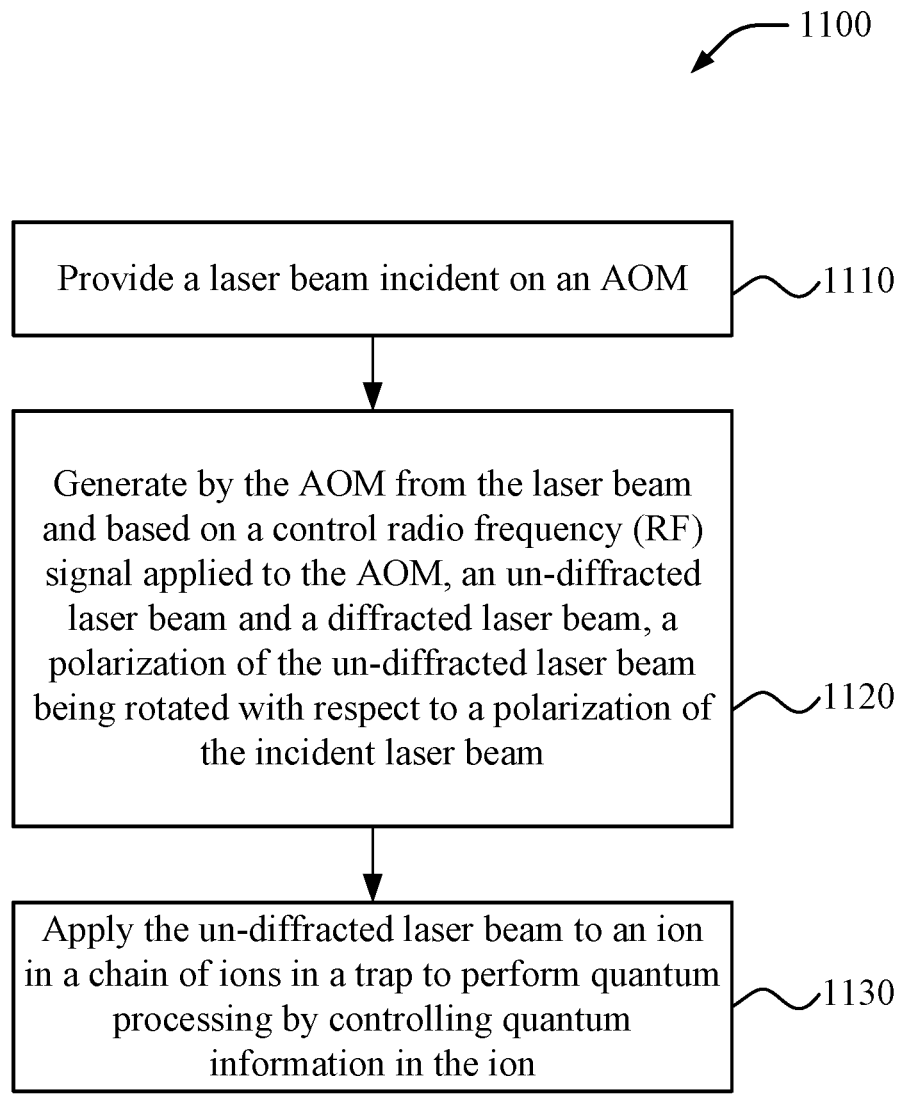

FIG. 11 is a flow diagram that illustrates an example of a method 1100 for polarization control in quantum processing in accordance with aspects of this disclosure. In an aspect, the method 1100 may be performed in a computer system (e.g., as part of the operations of the computer system) such as the computer device 800 described above, where, for example, the processor 810, the memory 820, the data store 840, and/or the operating system 860 may be used to perform or control the functions of the method 1100. Similarly, the functions of the method 1100 may be performed or controlled by one or more components of a QIP system such as the QIP system 1200 and its components (e.g., optical controller 1220 and its subcomponents) described in more detail below in connection with FIGS. 12A and 12B. Aspects of the method 1100 may be described in connection with the AOM configurations or implementations in at least FIGS. 7A and 7B.

At 1110, the method 1100 includes providing a laser beam incident on an AOM.

At 1120, the method 1100 includes generating by the AOM from the laser beam and based on a control RF signal applied to the AOM, an un-diffracted laser beam and a diffracted laser beam, a polarization of the un-diffracted laser beam being rotated with respect to a polarization of the incident laser beam.

At 1130, the method 1100 includes applying the un-diffracted laser beam to an ion in a chain of ions in a trap to perform quantum processing by controlling quantum information in the ion.

In another aspect of the method 1100, the method 1100 can include controlling the overall power of the un-diffracted laser beam by providing a second AOM upstream from the AOM. For example, the diagram 700 in FIG. 7C shows that the AOM 720 in FIGS. 7A and 7B is a first AOM 720 and there is a second or upstream AOM 720a as well for controlling the overall power of the un-diffracted laser beam.

In another aspect of the method 1100, the diffracted laser beam is a first order diffracted laser beam, the method 1100 further including controlling the overall power of the un-diffracted laser beam by providing a second AOM upstream from the AOM and applying the first order diffracted laser beam to the second AOM.

In yet another aspect of the method 1100, the method 1100 can include controlling the overall power of the un-diffracted laser beam by providing a second AOM upstream from the AOM and controlling a radio frequency (RF) power to the second AOM to maintain the overall power of the second AOM stable even in the presence of polarization control.

Figure 12A:
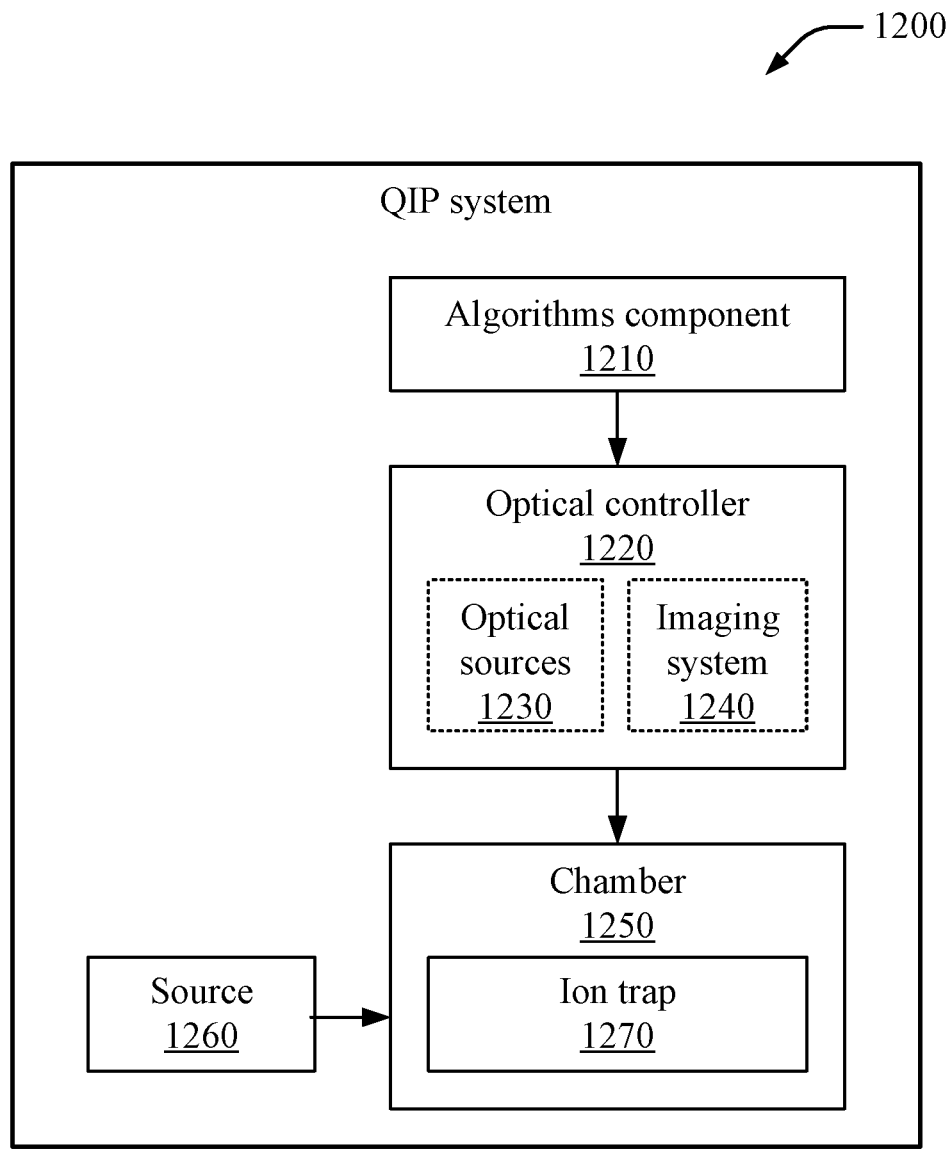
FIG. 12A is a block diagram that illustrates an example of a quantum information processing (QIP) system in accordance with aspects of this disclosure.

FIG. 12A is a block diagram that illustrates an example of a QIP system 1200 in accordance with aspects of this disclosure. The QIP system 1200 may also be referred to as a quantum computing system, a computer device, a trapped ion quantum computer, or the like. In an aspect, the QIP system 1200 may correspond to portions of a quantum computer implementation of the computer device 800 in FIG. 8.

Figure 12B:
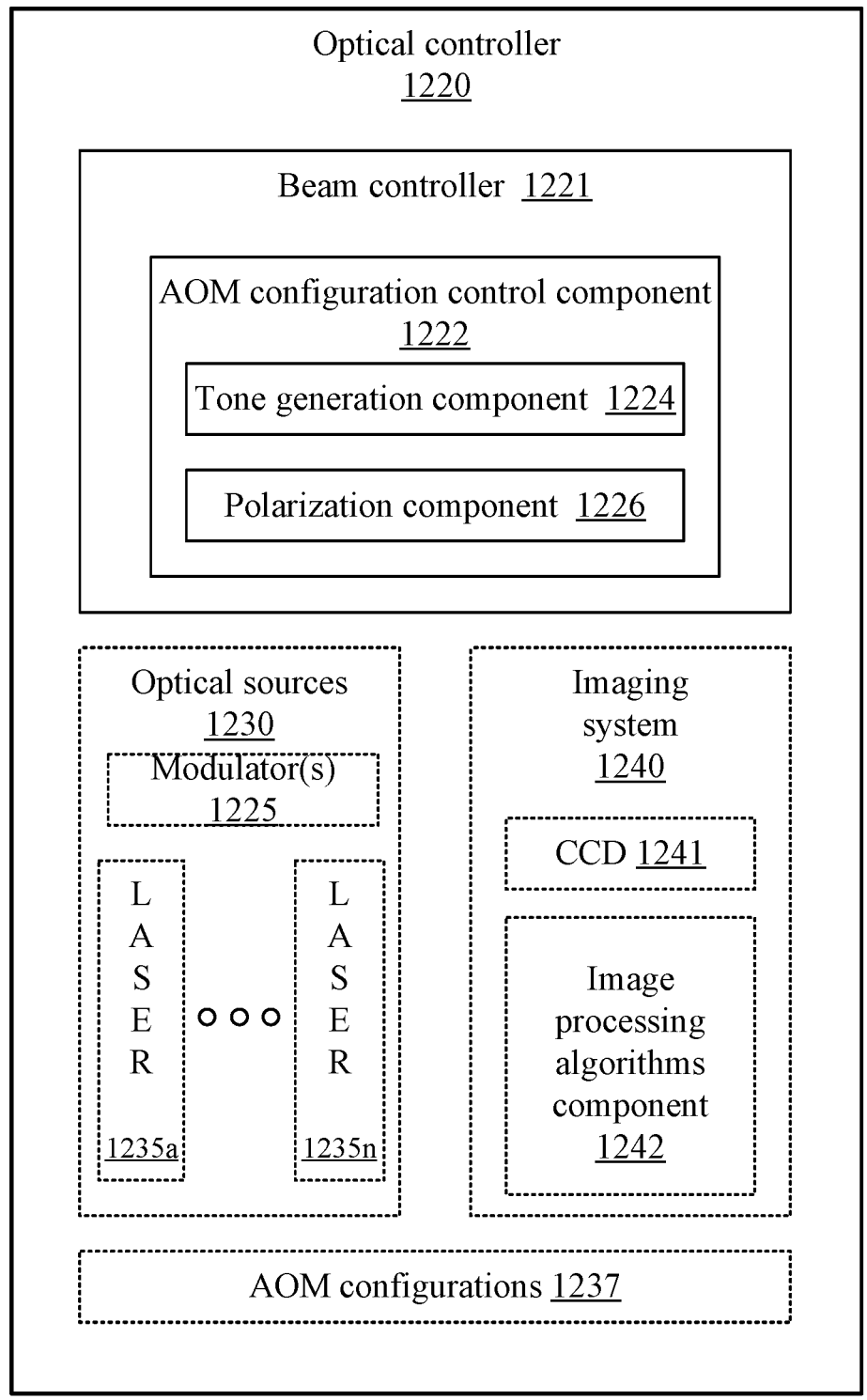
FIG. 12B is a block diagram that illustrates an example of an optical controller used in connection with parallelized sideband cooling in accordance with aspects of this disclosure.

The QIP system 1200 can include a source 1260 that provides atomic species (e.g., a flux of neutral atoms) to a chamber 1250 having an ion trap 1270 that traps the atomic species once ionized (e.g., photoionized) by an optical controller 1220 (see e.g., FIG. 12B). Optical sources 1230 in the optical controller 1220 may include one or more laser sources that can be used for ionization of the atomic species, control (e.g., phase control) of the atomic ions, for fluorescence of the atomic ions that can be monitored and tracked by image processing algorithms operating in an imaging system 1240 in the optical controller 1220, and/or to perform some of the AOM configurations and manipulations described in this disclosure. In an aspect, the optical sources 1230 may be implemented separately from the optical controller 1220.

The imaging system 1240 can include a high resolution imager (e.g., CCD camera) for monitoring the atomic ions while they are being provided to the ion trap or after they have been provided to the ion trap 1270. In an aspect, the imaging system 1240 can be implemented separate from the optical controller 1220, however, the use of fluorescence to detect, identify, and label atomic ions using image processing algorithms may need to be coordinated with the optical controller 1220. In another aspect, the imaging system 1240 can include imaging optics that can be used to direct photons scattered by the ions, wherein the photons can be used to obtain information such as the location of the ions and/or the quantum state of a qubit upon measurement. The photons may be directed to different types of detectors including imagers and/or single photon detectors such as photomultiplier tubes, for example. The photons may be directed to the detectors using optical fibers and/or other types of optical waveguides.

The QIP system 1200 may also include an algorithms component 1210 that may operate with other parts of the QIP system 1200 (not shown) to perform quantum algorithms or quantum operations, including single qubit operations or multi-qubit operations as well as extended quantum computations. As such, the algorithms component 1210 may provide instructions to various components of the QIP system 1200 (e.g., to the optical controller 1220) to enable the implementation of the quantum algorithms or quantum operations. In an example, the algorithms component 1210 may perform, coordinate, and/or instruct the performance of operations associated with the various AOM configurations described herein.

FIG. 12B shows at least a portion of the optical controller 1220. In this example, the optical controller 1220 can include a beam controller 1221, the optical sources 1230, the imaging system 1240, and AOM configurations 1237 that may include one or more of AOMs and optical components including DOE and lenses or lens assemblies. As shown by the dotted lines, one or more of the optical sources 1230, the imaging system 1240, and the AOM configurations 1237 may be implemented separate from, but in communication with, the optical controller 1220. The imaging system 1240 includes a CCD 1241 (or similar imager or camera) and an image processing algorithms component 1242. The optical sources 1230 includes a modulator 1225 and multiple laser sources 1235a, . . . , 1235b, which may be used for one or more of the functions described above (e.g., to produce laser or gate beams for manipulation of qubit information). In an aspect, the modulator 1225 may implement one or more of the RF generators described herein (e.g., RF generators 210a and 210b in FIG. 2).

The beam controller 1221 is configured to perform various aspects described herein for AOM configurations for quantum processing. The beam controller 1221 may include a AOM configuration control component 1222 having a tone generation component 1224 to control the various aspects associated with the generation and application of RF control signals based on different tones, and a polarization component 1226 to control the various aspects associated with using AOMs to provide fine and rapid control of polarization by generating appropriate RF control signals. In one implementation, the AOM configuration control component 1222 may be implemented separate from the beam controller 1221 but in communication with the beam controller 1221.

The various components of the optical controller 1220 may operate individually or in combination to perform the various functions described in this disclosure, for example, the methods 900, 1000, and 1100 in FIGS. 9, 10, and 11. Moreover, the various components of the optical controller 1220 may operate with one or more of the components of the QIP system 1200 to perform the various functions described in this disclosure, for example, the methods 900, 1000, and 1100 in FIGS. 9, 10, and 11.

While the examples described above are generally based on using two frequencies or tones, it is to be understood that similar techniques to the ones used in those examples also apply when more than two frequencies or tones are used. It is also to be understood that the techniques described above can be used not only for gate beams but also for continuous waves used for, for example, Doppler cooling and similar operations where isolation of the diffracted laser beams may be needed.

Although the present disclosure has been provided in accordance with the implementations shown, one of ordinary skill in the art will readily recognize that there could be variations to the embodiments and those variations would be within the scope of the present disclosure. Accordingly, many modifications may be made by one of ordinary skill in the art without departing from the scope of the appended claims.

What is claimed is:

1. A method for controlling laser beam propagation in quantum processing, comprising:
  generating, by a first acousto-optic modulator (AOM) from an incident laser beam, a first diffracted laser beam based on a first radio frequency (RF) tone and a second diffracted laser beam based on a second RF tone, wherein the first diffracted laser beam and the second diffracted laser beam are diffracted at different angles;
  focusing, via an optical component, the first diffracted laser beam and the second diffracted laser beam onto a second AOM;
  generating, by the second AOM from the first diffracted laser beam and the second diffracted laser beam, at least a third diffracted laser beam based on the first RF tone and a third RF tone and a fourth diffracted laser beam based on the second RF tone and a fourth RF tone, wherein the third diffracted laser beam and the fourth diffracted laser beam are diffracted to be substantially parallel when incident on a respective ion in a chain of ions in a trap; and
  controlling quantum information in the ion to perform quantum processing based on the third diffracted laser beam and the fourth diffracted laser beam.

2. The method of claim 1, wherein an angle of incidence of the incident laser beam and the focusing of the first diffracted laser beam and the second diffracted laser beam onto the second AOM are based on a Bragg angle.

3. The method of claim 1, wherein: the first RF tone is the same as the third RF tone, the second RF tone is the same as the fourth RF tone, and the third diffracted laser beam and the fourth diffracted laser beam are co-propagating at the respective ion.

4. The method of claim 1, wherein:
  the first RF tone is different from the third RF tone,
  the second RF tone is different from the fourth RF tone, and
  the third diffracted laser beam and the fourth diffracted laser beam are substantially co-propagating at the respective ion.

5. The method of claim 1, further comprising:
  generating a first RF control signal based on the first RF tone;
  generating a second RF control signal based on the second RF tone;
  generating a third RF control signal based on the third RF tone;
  generating a fourth RF control signal based on the fourth RF tone;
  providing the first RF control signal and the second RF control to the first AOM to generate the first diffracted laser beam and the second diffracted laser beam, respectively; and
  providing the third RF control signal and the fourth RF control to the second AOM to generate the third diffracted laser beam and the fourth diffracted laser beam, respectively.

6. The method of claim 1, wherein generating at least the third diffracted laser beam and the fourth diffracted laser beam includes generating a fifth diffracted laser beam based on the first RF tone and the fourth RF tone and a sixth diffracted laser beam based on the second RF tone and the third RF tone,
  the method further comprising isolating the third diffracted laser beam and the fourth diffracted laser beam from the fifth diffracted laser beam and the sixth diffracted laser beam by spatial filtering.

7. The method of claim 1, wherein:
  each of the first AOM and the second AOM is a multi-channel AOM,
  each channel in the first AOM has a respective first RF tone and second RF tone, and
  each channel in the second AOM has a respective third RF tone and fourth RF tone.

8. The method of claim 1, wherein:
the first AOM is a multi-channel AOM and the second AOM is a single-channel AOM, or
the first AOM is a single-channel AOM and the second AOM is a multi-channel AOM.

9. The method of claim 1, wherein:
the first AOM is a large aperture AOM and the second AOM is a multi-channel AOM,
the first RF tone and the second RF tone are common to all channels of the first AOM, and
the third RF tone and the fourth RF tone are individually set for each of the channels of the second AOM.

10. The method of claim 1, wherein:
the first AOM is a multi-channel AOM and the second AOM is a large aperture AOM,
the first RF tone and the second RF tone are individually set for each of the channels of the first AOM, and
the third RF tone and the fourth RF tone are common to all channels of the second AOM.

11. A method for controlling laser beam propagation in quantum processing, comprising:
generating, by a first acousto-optic modulator (AOM) from an incident laser beam, a first diffracted laser beam based on a first radio frequency (RF) tone and a second diffracted laser beam based on a second RF tone, wherein the first diffracted laser beam and the second diffracted laser beam are diffracted at different angles;
focusing, via an optical component, the first diffracted laser beam and the second diffracted laser beam onto opposite Bragg angle paths into a second AOM;
generating, by the second AOM from the first diffracted laser beam and the second diffracted laser beam, at least a third diffracted laser beam based on the first RF tone and a third RF tone and a fourth diffracted laser beam based on the second RF tone and the third RF tone, wherein the third diffracted laser beam and the fourth diffracted laser beam are diffracted to be substantially parallel when incident on a respective ion in a chain of ions in a trap; and
controlling quantum information in the ion to perform quantum processing based on the third diffracted laser beam and the fourth diffracted laser beam.

12. The method of claim 11, wherein:
each of the first AOM and the second AOM is a multi-channel AOM,
each channel in the first AOM has a respective first RF tone and second RF tone, and
each channel in the second AOM has a respective third RF tone.

13. The method of claim 11, wherein:
the first AOM is a multi-channel AOM and the second AOM is a single-channel AOM, or
the first AOM is a single-channel AOM and the second AOM is a multi-channel AOM.

14. The method of claim 11, wherein:
the first AOM is a large aperture AOM and the second AOM is a multi-channel AOM,
the first RF tone and the second RF tone are common to all channels of the first AOM, and
the third RF tone is individually set for each of the channels of the second AOM.

15. The method of claim 11, wherein:
the first AOM is a multi-channel AOM and the second AOM is a large aperture AOM,
the first RF tone and the second RF tone are individually set for each of the channels of the first AOM, and
the third RF tone is common to all channels of the second AOM.

16. A quantum information processing (QIP) system for controlling laser beam propagation in quantum processing, comprising:
one or more optical sources configured to generate a laser beam;
a first acousto-optic modulator (AOM) configured to generate, from the laser beam, a first diffracted laser beam based on a first radio frequency (RF) tone and a second diffracted laser beam based on a second RF tone, wherein the first diffracted laser beam and the second diffracted laser beam are diffracted at different angles;
an optical component configured to focus the first diffracted laser beam and the second diffracted laser beam onto a second AOM;
the second AOM configured to generate, from the first diffracted laser beam and the second diffracted laser beam, at least a third diffracted laser beam based on the first RF tone and a third RF tone and a fourth diffracted laser beam based on the second RF tone and a fourth RF tone, wherein the third diffracted laser beam and the fourth diffracted laser beam are diffracted to be substantially parallel when incident on a respective ion in a chain of ions in a trap; and
a beam controller configured to control quantum information in the ion to perform quantum processing based on the third diffracted laser beam and the fourth diffracted laser beam.

17. The QIP system of claim 16, wherein:
each of the first AOM and the second AOM is a multi-channel AOM,
each channel in the first AOM has a respective first RF tone and second RF tone, and
each channel in the second AOM has a respective third RF tone.

18. The QIP system of claim 16, wherein:
the first AOM is a multi-channel AOM and the second AOM is a single-channel AOM, or
the first AOM is a single-channel AOM and the second AOM is a multi-channel AOM.

19. The QIP system of claim 16, wherein:
the first AOM is a large aperture AOM and the second AOM is a multi-channel AOM, or
the first AOM is a multi-channel AOM and the second AOM is a large aperture AOM.

20. A method for polarization control in quantum processing, comprising:
providing a laser beam incident on an acousto-optic modulator (AOM);
generating by the AOM from the laser beam and based on a control radio frequency (RF) signal applied to the AOM, an un-diffracted laser beam and a diffracted laser beam, a polarization of the un-diffracted laser beam being rotated with respect to a polarization of the incident laser beam; and
applying the un-diffracted laser beam to an ion in a chain of ions in a trap to perform quantum processing by controlling quantum information in the ion.

21. The method of claim 20, further comprising controlling overall power of the un-diffracted laser beam by providing a second AOM upstream from the AOM.

22. The method of claim 20, wherein the diffracted laser beam is a first order diffracted laser beam, the method further comprising controlling the overall power of the un-diffracted laser beam by providing a second AOM upstream from the AOM and applying the first order diffracted laser beam to the second AOM.

23. The method of claim 20, further comprising controlling the overall power of the un-diffracted laser beam by providing a second AOM upstream from the AOM and controlling a radio frequency (RF) power to the second AOM to maintain the overall power of the second AOM stable even in the presence of polarization control.

* * * * *